US012332353B2

(12) United States Patent
Gum et al.

(10) Patent No.: US 12,332,353 B2
(45) Date of Patent: Jun. 17, 2025

(54) CELLULAR RADIO FREQUENCY (RF) SENSING IN AUTOMOBILE NAVIGATION

(71) Applicant: QUALCOMM Incorporated, San Diego, CA (US)

(72) Inventors: Arnold Jason Gum, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/820,068

(22) Filed: Aug. 16, 2022

(65) Prior Publication Data

US 2024/0061119 A1 Feb. 22, 2024

(51) Int. Cl.

*G01S 17/86* (2020.01)
*G01S 5/02* (2010.01)

(Continued)

(52) U.S. Cl.

CPC .......... *G01S 17/86* (2020.01); *G01S 5/02521* (2020.05); *G01S 5/145* (2013.01); *G01S 13/931* (2013.01)

(58) Field of Classification Search

CPC ...... G01S 17/86; G01S 5/02521; G01S 5/145; G01S 13/931; G01S 13/867;

(Continued)

(56) References Cited

U.S. PATENT DOCUMENTS 10,503,985 B2 * 12/2019 Gokan .................... G01S 13/86
10,814,879 B2 10/2020 Miura et al.

(Continued)

FOREIGN PATENT DOCUMENTS

EP 1947475 A1 * 7/2008 ......... B60R 21/0134
EP 1947475 8/2012

(Continued)

OTHER PUBLICATIONS

Partial International Search Report—PCT/US2023/070375—ISA/EPO—Jan. 29, 2024.

(Continued)

*Primary Examiner* — Mahendra R Patel
(74) *Attorney, Agent, or Firm* — Weaver Austin Villeneuve & Sampson LLP/QUALCOMM

(57) ABSTRACT

An example method for obtaining data at a vehicle for automobile navigation based on cellular radio frequency (RF) sensing comprising obtaining, with a camera at the vehicle, a camera image of an environment surrounding the vehicle. The method further comprises determining a failure condition of the camera preventing object detection of the camera image, wherein the failure condition is caused by inclement weather, blockage on a lens of the camera, electrical failure of the camera, or a combination thereof. The method further comprises responsive to determining the failure condition of the camera, configuring a cellular communication interface of the vehicle to obtain cellular RF sensing data of the environment surrounding the vehicle. The method further comprises performing the automobile navigation support based at least in part on cellular RF sensing data of the environment surrounding the vehicle.

7 Claims, 9 Drawing Sheets

Satellite 120
Satellite 120
Static object 130
Dynamic objects 140
Vehicle 110
Road 125

(51) Int. Cl.
*G01S 5/14* (2006.01)
*G01S 13/931* (2020.01)

(58) Field of Classification Search
CPC ........ G01S 2205/01; G01S 5/02; G01S 7/006; B60W 50/029; B60W 60/00186; B60W 60/0053; B60W 60/0059; B60W 2050/0215; B60W 2420/408; B60W 2556/45; G01C 21/3841; G01C 21/3896; G01C 21/1656
USPC ........................................................ 455/456.1
See application file for complete search history.

(56) References Cited

U.S. PATENT DOCUMENTS

| | | | | |
|---|---|---|---|---|
| 10,853,665 | B2 * | 12/2020 | Kang | G05D 1/0278 |
| 11,056,002 | B2 * | 7/2021 | Andersson | G08G 1/166 |
| 11,407,409 | B2 * | 8/2022 | Olson | B60W 60/0011 |
| 11,543,832 | B2 * | 1/2023 | Baldwin | G05D 1/0214 |
| 11,544,936 | B2 * | 1/2023 | Chen | B60W 50/14 |
| 11,550,334 | B2 * | 1/2023 | Zheng | G06V 20/56 |
| 11,593,344 | B2 * | 2/2023 | Bailly | G01C 21/3848 |
| 11,741,709 | B2 * | 8/2023 | Korjus | G06V 20/10<br>382/104 |
| 11,860,305 | B2 * | 1/2024 | Droz | G01S 17/86 |
| 11,898,871 | B2 * | 2/2024 | White | G01C 21/3889 |
| 12,023,812 | B2 * | 7/2024 | Casas | B25J 9/1664 |
| 12,093,042 | B2 * | 9/2024 | Della Penna | G08G 1/0133 |
| 12,111,408 | B2 * | 10/2024 | Edge | G01S 13/08 |
| 2011/0238286 | A1 * | 9/2011 | Roesser | G01S 5/02526<br>701/532 |
| 2013/0131908 | A1 * | 5/2013 | Trepagnier | B60W 30/00<br>701/1 |
| 2013/0211656 | A1 * | 8/2013 | An | B62D 15/027<br>701/25 |
| 2014/0358322 | A1 * | 12/2014 | Ibrahim | G05D 1/0055<br>701/1 |
| 2016/0231746 | A1 * | 8/2016 | Hazelton | G05D 1/0274 |
| 2017/0075355 | A1 * | 3/2017 | Micks | G05D 1/0274 |
| 2019/0346860 | A1 * | 11/2019 | Houts | G01S 11/04 |
| 2020/0391745 | A1 | 12/2020 | Mori et al. | |
| 2021/0061306 | A1 * | 3/2021 | Dagan | H04W 4/40 |
| 2021/0063199 | A1 * | 3/2021 | Akbarzadeh | G06N 3/08 |
| 2023/0258763 | A1 * | 8/2023 | Donderici | G01S 5/0072<br>701/24 |
| 2023/0324543 | A1 * | 10/2023 | Kulkarni | G01C 21/3815 |

FOREIGN PATENT DOCUMENTS

| | | | | |
|---|---|---|---|---|
| EP | 3299259 | A1 * | 3/2018 | B60N 2/002 |
| EP | 3299259 | | 7/2019 | |
| KR | 20180056322 | A | 5/2018 | |
| WO | WO-2022081624 | A1 * | 4/2022 | G01S 13/87 |

OTHER PUBLICATIONS

Wymeersch H., et al., "5G mmWave Positioning for Vehicular Networks", IEEE Wireless Communications, Coordinated Science Laboratory, Dept. Electrical and Computer Engineering, University of Illinois at Urbana-champaign, US, vol. 24, No. 6, Dec. 1, 2017, 7 Pages, XP011675648.
International Search Report and Written Opinion—PCT/US2023/070375—ISA/EPO—Apr. 24, 2024.
Mostafavi S.S., et al., "Vehicular Positioning Using 5G Millimeter Wave and Sensor Fusion in Highway Scenarios", ICC 2020—2020 IEEE International Conference on Communications (ICC), Jun. 7, 2020, pp. 1-7, XP033798081, DOI: 10.1109/ICC40277.2020.9149067, Section IV.

* cited by examiner

CELLULAR RADIO FREQUENCY (RF) SENSING IN AUTOMOBILE NAVIGATION

BACKGROUND

Vehicle systems, such as autonomous driving and advanced driver-assist systems (ADAS) often use camera-based navigation systems to operate correctly. However, camera-based systems are susceptible to vision-blocking weather conditions such as snow, rain and fog. To reduce the impact of inclement weather, some vehicles implement extra non-vision-based detection systems as back-up in addition to the camera-based detection systems, such as radio detection and ranging (Radar) or other radio frequency (RF)-based systems. However, those additional systems are expensive and for cost-saving reasons may not be available to some vehicles.

BRIEF SUMMARY

Techniques provided herein are directed toward obtaining data at a vehicle for automobile navigation based on cellular communications (e.g., 5th Generation (5G) and/or 5G New Radio (NR) radio frequency (RF) sensing). Embodiments include the vehicle determining a failure condition of a camera at the vehicle preventing object detection of a camera image taken by the camera caused by inclement weather, blockage on a lens of the camera, electrical failure of the camera, or a combination thereof. The vehicle can then configure a cellular communication interface (e.g., 5G communication interface) of the vehicle to detect cellular RF sensing data of the geographical location of the vehicle and perform the automobile navigation based at least in part on 5G RF sensing data of the geographical location of the vehicle.

An example method for obtaining data at a vehicle for automobile navigation based on cellular radio frequency (RF) sensing comprising obtaining, with a camera at the vehicle, a camera image of an environment surrounding the vehicle. The method further comprises determining a failure condition of the camera preventing object detection of the camera image, wherein the failure condition is caused by inclement weather, blockage on a lens of the camera, electrical failure of the camera, or a combination thereof. The method further comprises responsive to determining the failure condition of the camera, configuring a cellular communication interface of the vehicle to obtain cellular RF sensing data of the environment surrounding the vehicle. The method further comprises performing the automobile navigation support based at least in part on cellular RF sensing data of the environment surrounding the vehicle.

An example method for updating a RF sensing map based on cellular radio frequency (RF) sensing comprising obtaining, from a first vehicle, a first set of cellular RF sensing data of an environment surrounding the first vehicle. The method further comprises determining a unified cellular RF sensing map based on unifying the first set of cellular RF sensing data with a second set of cellular RF sensing data, wherein the second set of cellular RF sensing data is obtained from a second vehicle. The method further comprises updating a RF sensing map, corresponding to the environment surrounding the first vehicle based on the unified cellular RF sensing map, responsive to a determination that a match between the unified cellular RF sensing map and the RF sensing map is below a predetermined threshold.

An example method for using a RF sensing map for assisting cellular RF sensing for automobile navigation comprising obtaining, from a server, the RF sensing map corresponding to a trip before the trip. The method further comprises obtaining, by a cellular communication interface of a vehicle, cellular RF sensing data of an environment surrounding the vehicle, wherein obtaining the cellular RF sensing data is responsive to a determination of a failure condition of a camera of the vehicle, preventing object detection of a camera image obtained by the camera, wherein the condition is caused by inclement weather, blockage on a lens of the camera, electrical failure of the camera, or a combination thereof. The method further comprises increasing an alert level responsive to a determination that a match between the cellular RF sensing data and the RF sensing map is below a predetermined threshold, wherein increasing the alert level comprises at least one of reducing a driving speed of the vehicle or falling back to a manual driving mode.

An example method for automobile navigation using cellular RF sensing map comprising receiving, from a vehicle, a request for a cellular RF sensing map corresponding to an environment surrounding the vehicle, wherein the cellular RF sensing map is generated based on data obtained from cellular RF communication interfaces. The method further comprises determining the cellular RF sensing map based on a specification of the vehicle. The method further comprises transmitting the cellular RF sensing map to the vehicle.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
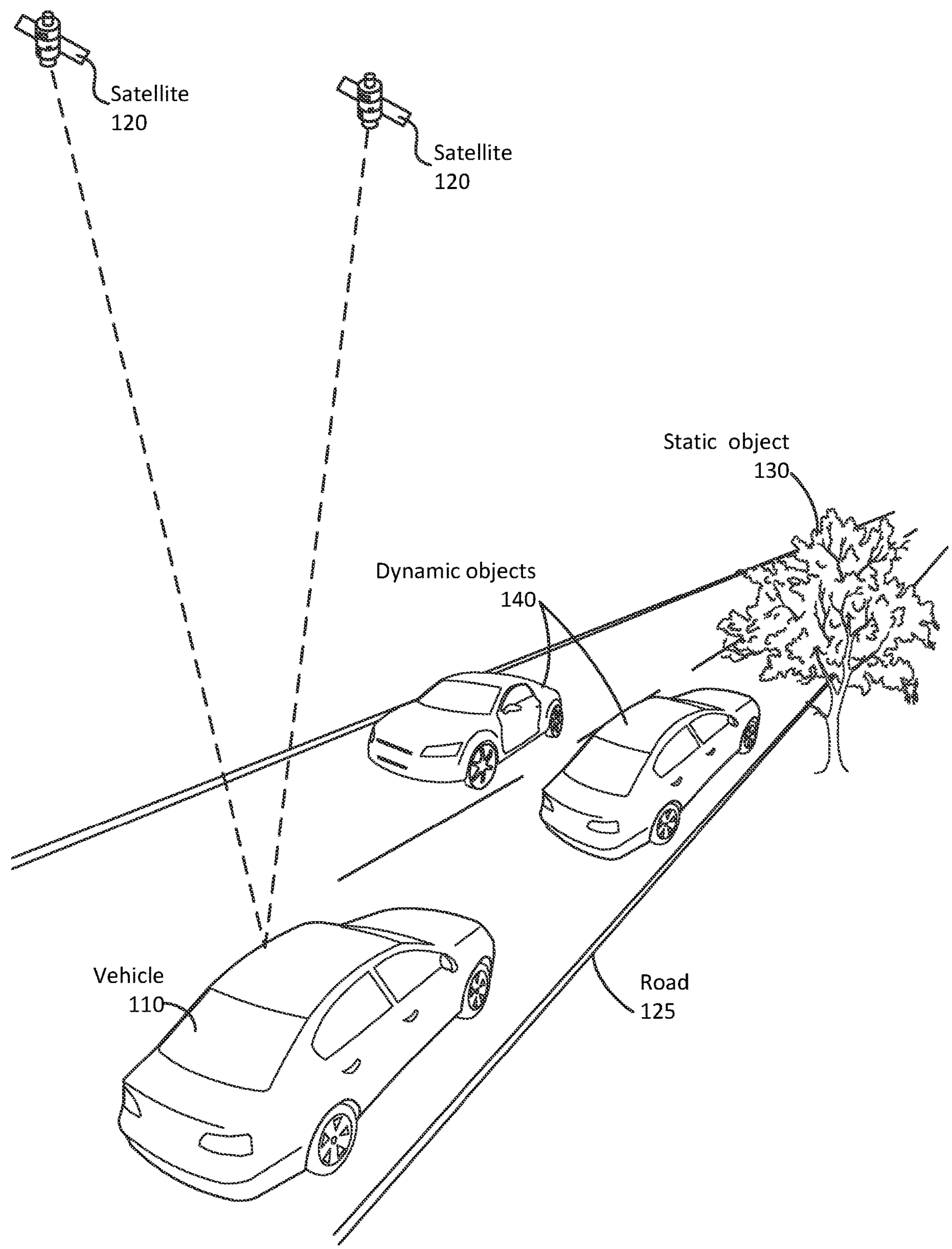
FIG. 1 is a drawing of a perspective view of a vehicle.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. The ensuing description provides embodiment (s) only, and is not intended to limit the scope, applicability, or configuration of the disclosure. Rather, the ensuing description of the embodiment(s) will provide those skilled in the art with an enabling description for implementing an embodiment. It is understood that various changes may be made in the function and arrangement of elements without departing from the scope of this disclosure.

The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

It is understood that although the although some of embodiments described herein are directed towards 5th Generation (5G) and/or 5G New Radio (NR) wireless communications, the techniques provided herein are not limited to the disclosed embodiments. Any other suitable cellular communications as a system utilizing 3G, 4G, 5G, 6G, or further implementations thereof, technology may be used for providing extra support to automobile navigation as disclosed herein.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

As used herein, the term "automobile navigation" of a vehicle can refer to any level of vehicle autonomy in providing driving assistance (e.g., any vehicle autonomy) from level 1 to level 5. This can mean, for example, providing driver assistance (e.g., steering or accelerating/cruise control), partial driving automation (e.g., steering and accelerating/cruise control, such as an advanced driver assistance systems (ADAS)), conditional driving automation (e.g., including environmental detection in addition to partial driving automation), high driving automation, and/or full driving automation.

As used herein, the term "position estimate" of a vehicle is an estimation of the location of the vehicle within a frame of reference. This can mean, for example, an estimate of vehicle location on a 2D coordinate frame (e.g., latitude and longitude on a 2D map, etc.) or within a 3D coordinate frame (e.g., latitude, longitude, and altitude (LLA) on a 3D map), and may optionally include orientation information, such as heading. In some embodiments, a position estimate may include an estimate of six degrees of freedom (6-DOF) (also known as "pose"), which includes translation (latitude, longitude, and altitude) and orientation (pitch, roll, and yaw) information.

As used herein, the terms "map," "map data," and derivatives thereof may refer to an electronic representation of a physical location or geographical area. As noted, map data may include different "layers" of different data types, such as radar, camera, RF sensing, etc. As a person of ordinary skill in the art will understand, this electronic representation may be stored in a database or other data structure (in any of a variety of storage mediums) as one or more electronic files, data objects, or the like.

It can be noted that, the embodiments described herein below are directed toward determining the position/object detection of a vehicle, embodiments are not so limited. Alternative embodiments, for example, may be directed toward other mobile devices and/or applications in which position/object detection determination is made. A person of ordinary skill in the art will recognize many variations to the embodiments described herein.

Autonomous driving systems and advanced driver-assist systems (ADAS) using sensors (e.g., a global navigation satellite system (GNSS) receiver and cameras) can provide centimeter-level accuracy. As previously noted, such solutions may fail in certain scenarios (tunnels, bad light conditions, rainy or snowy days, urban canyon scenarios, camera failure etc.) prohibiting seamless and ubiquitous use of the autonomous driving technology. On the other hand, using extra complimentary systems such as radio detection and ranging (radar) or other radio frequency (RF)-based systems as back-up systems may be expensive and thus may not be available to some vehicle modes branded for cost-savings, such as economic vehicles.

According to embodiments disclosed herein, a 5G communication interface (e.g., 5G transceivers) equipped on a vehicle and configured primarily for communicating 5G RF signals (e.g., comprising an electromagnetic wave that transports information through the space between a transmitter (or transmitting device) and a receiver (or receiving device)), may be configured to provide extra detection and/or positioning in conditions where the camera fails to function (e.g., caused by inclement weather, blockage on a lens of the camera, electrical failure of the camera, or a combination thereof).

When activated (e.g., when a failure condition of the camera preventing object detection of the camera image is determined), the 5G communication interface may obtain 5G RF sensing data of the environment surrounding the vehicle (e.g., using the 5G RF signals) to provide extra object detection and/or automobile navigation support. For example, the 5G RF sensing data may be used for detecting objects/obstacles directly (e.g., determined based on the reflected 5G RF signals), or indirectly. For example, when detecting the objects/obstacles indirectly, the 5G RF sensing data may be compared with a RF sensing map (e.g., received from a server) corresponding to the environment surrounding (e.g., the geographical region of) the vehicle to determine if a change of the environment is happened (e.g., a match between the RF sensing map and the 5G RF sensing data is below a predetermined threshold). In some embodiments, the comparison between the 5G RF sensing data and the RF sensing map may also be used for positioning of the vehicle in support of/complementary to the GNSS (e.g., when the GNSS signal is poor or out of functioning). In some embodiments, the RF sensing map (also referred as "RF map" or "5G RF sensing map") may be a layer of a crowded sourced HD map.

In some embodiments, the RF map may be obtained (e.g., downloaded from the server) in response to the activation of the 5G RF sensing. For example, once the failure condition of the camera preventing object detection of the camera image is detected, the vehicle may transmit a request to the server for the RF map of the environment surrounding the vehicle. The server may transmit the RF map in response to receiving the request. For another example, the RF map may be obtained ahead of time (e.g., before the trip and/or at a region where the network for data transmission is good). In some embodiments, before transmitting the RF map to the vehicle, the server may pre-process the RF map according to a specification (e.g., a model and/or an arrangement of the 5G RF antenna on the vehicle) of the requesting vehicle (e.g., adjust a unified RF map according to the specification of the requesting vehicle and/or transmit the RF map corresponding to the specification of requesting vehicle).

In some embodiments, because the 5G communication system can provide an approximate/rough detection of objects/obstacles that may interfere with the driving and/or an approximate/rough positioning of the vehicle, when those objects/obstacles are detected either directly (e.g., based on the returned 5G RF signals) or indirectly (e.g., based on being compared with the RF map of the environment surrounding the vehicle), an alert level for automobile navigation may be increased. For example, a driving speed of the vehicle may be reduced, and/or the automobile navigation may fall back to a manual driving mode. Accordingly, the 5G communication system may be implemented as a cost-effective support/complement to the camera-based detecting system for object detection and/or positioning in challenging scenarios (e.g., night time, inclement weather, camera malfunctions, underground, or tunnel scenarios).

In addition, in some embodiments, upon determination that the environment has changed, the vehicle may publish the 5G RF sensing data (e.g., to the server) for updating the RF map (e.g., in a crowdsource mapping fashion). For example, the server may determine whether to update the RF map. If the server determines to update the RF map, the RF map may be updated based on the published 5G RF sensing data according to the specification of the publishing vehicle. In some embodiments, before updating the RF sensing map, the server may unify 5G RF sensing data according to the specification of the publishing vehicle (e.g., classify 5G RF sensing data according to the specification of the publishing vehicle and/or adjust the 5G RF sensing data to a unified format according to the specification of the publishing vehicle).

Figure 2:
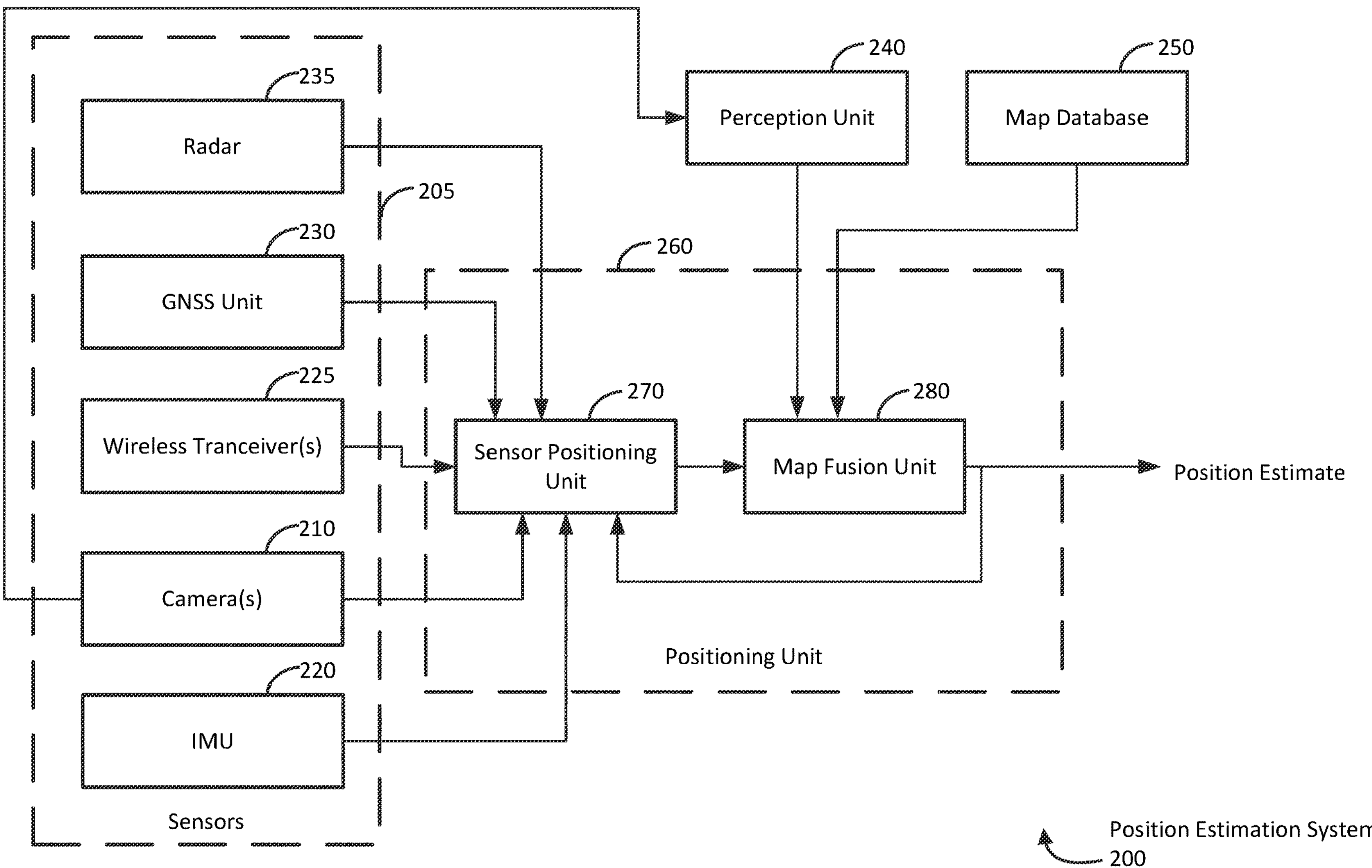
FIG. 2 is a block diagram of a position estimation system, according to an embodiment.

Additional details regarding object detection/positioning of a vehicle are provided with regard to FIGS. 1 and 2. It is noted that the positioning and the object detection are described interchangeably to some extent herein. This is because positioning can be based in part on object detection, and vice versa. For example, the positioning function may include performing the object detection function (e.g., including detecting the environment using the sensors, and positioning of the vehicle using the detected data) and the detection function may also include performing the positioning function (e.g., including comparing the detected data with the corresponding map based on the determined position of the vehicle). Accordingly, although FIGS. 1 and 2 describe the components and functions of positioning systems, it is noted that those components may also be used for object/obstacle detection in automobile navigation.

FIG. 1 is a drawing of a perspective view of a vehicle 110, illustrating how positioning out the vehicle 110 generally may be performed, according to embodiments. In some embodiments, the vehicle 110 may further perform the crowdsourced mapping (e.g., the generation/update of the HD map including the RF map layer based on crowdsourcing) according to the positioning of the vehicle 110. Here, the vehicle 110 (also referred to as the "ego vehicle") may first determine its position. In some embodiments, the vehicle 110 may further use its determined position along with sensors such as cameras, radar, or RF interface (e.g., a RF transceiver) to gather information for one or more layers of the HD map under certain conditions (e.g., determines that a change of the geographical region happens). In some embodiments, as noted above, the position of the vehicle and the crowdsourced map may also in turn be used in the object/obstacle detection for automobile navigation support/complement (e.g., comparing the 5G RF sensing data with the corresponding RF map).

Positioning may be performed using a GNSS receiver at the vehicle 110 to receive radio frequency (RF) signals transmitted by GNSS satellites 120. (Of course, although satellites 120 in FIG. 1 are illustrated as relatively close to the vehicle 110 for visual simplicity, it will be understood that satellites 120 will be in orbit around the earth. Moreover the satellites 120 may be part of a large constellation of satellites of a GNSS system. Additional satellites of such a constellation are not shown in FIG. 1.) Additionally or alternatively, the terrestrial positioning may be performed using RF signals from terrestrial beacons are transceivers, such as base stations from a cellular communication network. Vehicle sensors and an HD map may also be used to help determine an accurate position of the vehicle 110. (Additional details regarding how these different components can be used for positioning are provided with regard to FIG. 2.)

The position of the vehicle 110 may be used for purposes such as vehicle maneuvering, navigation, automobile navigation, as well as mapping and so forth. For example, as noted above, when detecting objects/obstacles by comparing the sensor data (e.g., the 5G RF sensing data) with the map (e.g., the RF map obtained from a server), the determined position of the vehicle may help determining the portion of the map corresponding to the geographical region of the vehicle (e.g., the 5G RF sensing data may be compared with the corresponding portion of the map to determine if a change of the geographical region represented by the map happens). In some embodiments, the positioning may also be used when updating the map (e.g., determine the corresponding portion of the map to be updated using the sensor data).

FIG. 2 is a block diagram of a position estimation system 200, according to an embodiment. The position estimation system 200 collects data from various different sources and outputs a position estimate of the vehicle. This position estimate can be used by an automated driving system, ADAS system, and/or other automobile navigation systems on the vehicle, as well as systems (e.g., traffic monitoring systems) remote to the vehicle. Additionally, as noted, the position estimate of the vehicle can be used by a mapping system of the vehicle when performing the techniques for mapping described hereafter. The position estimation system 200 comprises sensors 205 including one or more cameras 210, an inertial measurement unit (IMU) 220, and a GNSS unit 230. In some embodiments, the position estimation system 200 may further include a radar 235. It is contemplated that although the radar 235 is described herein, techniques disclosed here may also be implemented in systems without the radar 235.

The position estimation system 200 further comprises a perception unit 240, a map database 250, and a positioning unit 260 comprising a sensor positioning unit 270 and a map fusion unit 280. In alternative embodiments, the components illustrated in FIG. 2 may be combined, separated, omitted, rearranged, and/or otherwise altered, depending on desired functionality. Moreover, in alternative embodiments, position estimation may be determined using additional or alternative data and/or data sources. For example, sensors 205 may include one or more additional or alternative sensors (e.g., lidar, sonar, etc.). One or more components of the position estimation system 200 may be implemented in hardware and/or software, such as one or more hardware and/or software components of the mobile computing system 800 illustrated in FIG. 8 and described in more detail below. For example, the positioning unit 260 may be implemented by one or more processing units. The various hardware and/or software components that implement the positioning estimation system 200 may be distributed at various different locations on a vehicle, depending on desired functionality.

Wireless transceiver(s) 225 may comprise one or more RF transceivers (e.g., Wi-Fi transceiver, Wireless Wide Area Network (WWAN) or cellular transceiver, Bluetooth transceiver, etc.) for receiving positioning data from various terrestrial positioning data sources. These terrestrial positioning data sources may include, for example, Wi-Fi Access Points (APs) (Wi-Fi signals including Dedicated Source Range Communications (DSRC) signals), cellular base stations (e.g., cellular-based signals such as Positioning Reference Signals (PRS) or signals communicated via Vehicle-to-Everything (V2X), cellular V2X (CV2X), or Long-Term Evolution (LTE) direct protocols, etc.), and/or other positioning sources such as roadside units (RSUs), etc. Wireless transceiver(s) 225 also may be used for wireless communication (e.g., via Wi-Fi, cellular, etc.), in which case wireless transceivers 225 may be incorporated into a wireless communication interface of the vehicle.

In some embodiments, wireless transceiver(s) 225 may further include 5G RF transceivers (also referred as the 5G communication interface), configured primarily to communicate 5G RF signals (e.g., transmit and receive the 5G RF signals). As will be described in detail below, under certain conditions (e.g., when a failure condition of the camera preventing object detection of the camera image is determined), the 5G RF transceivers may be configured to provide extra detection and/or positioning, complementary to the other components described in the position estimation system 200. In some embodiments, 5G RF transceivers (e.g., the 5G RF antennas) may be front-facing, upward-facing, backward-facing, downward-facing, and/or otherwise positioned on the top of the vehicle to communicate 5G RF signals as well as gather information regarding the vehicle's surroundings when activated. In some embodiments, the 5G RF transceivers may comprise an antenna array that can transmit and/or receive RF signals using one or more directional beams. These beams may be fixed with respect to the vehicle (e.g., front-facing, upward-facing, etc.) or may be dynamic (e.g., may be "steered" in different directions).

The GNSS unit 230 may comprise a GNSS receiver and GNSS processing circuitry configured to receive signals from GNSS satellites (e.g., satellites 120) and GNSS-based positioning data. The positioning data output by the GNSS unit 230 can vary, depending on desired functionality. In some embodiments, the GNSS unit 230 may provide, among other things, a three-degrees-of-freedom (3-DOF) position determination (e.g., latitude, longitude, and altitude). Additionally or alternatively, the GNSS unit 230 can output the underlying satellite measurements used to make the 3-DOF position determination. Additionally, or alternatively, the GNSS unit can output raw measurements, such as pseudorange and carrier-phase measurements.

The camera(s) 210 may comprise one or more cameras disposed on or in the vehicle, configured to capture images, from the perspective of the vehicle, to help track movement of the vehicle. The camera(s) 210 may be front-facing, upward-facing, backward-facing, downward-facing, and/or otherwise positioned on the vehicle. Other aspects of the camera(s) 210, such as resolution, optical band (e.g., visible light, infrared (IR), etc.), frame rate (e.g., 30 frames per second (FPS)), and the like, may be determined based on desired functionality. Movement of the vehicle 110 may be tracked from images captured by the camera(s) 210 using various image processing techniques to determine motion blur, object tracking, and the like. The raw images and/or information resulting therefrom may be passed to the sensor positioning unit 270, which may perform visual inertial odometry (VIO) using the data from both the camera(s) 210 and the IMU 220.

IMU 220 may comprise one or more accelerometers, gyroscopes, and/or (optionally) other sensors, such as magnetometers, to provide inertial measurements. Similar to the camera(s) 210, the output of the IMU 220 to the sensor positioning unit 270 may vary, depending on desired functionality. In some embodiments, the output of the IMU 220 may comprise information indicative of a 3-DOF position or 6-DOF pose of the vehicle 110, and/or a 6-DOF linear and angular velocities of the vehicle 110, and may be provided periodically, based on a schedule, and/or in response to a triggering event. The position information may be relative to an initial or reference position. Alternatively, the IMU 220 may provide raw sensor measurements.

In some embodiments, the radar 235 may comprise one or more radar sensors disposed in or on the vehicle. Similar to the camera(s) 210, radar may be front-facing, upward-facing, backward-facing, downward-facing, and/or otherwise positioned on the vehicle to gather information regarding the vehicle's surroundings. According to some embodiments, a radar may scan an area or volume near the vehicle at a rate of once every second or more, or several times per second (e.g., 5, 10, 20, 50, or 100 times per second, for example), and this scan rate may be dynamic, depending on sensor capability, processing capabilities, traffic conditions, etc. Radar scans may also be referred to herein as "frames."

It is noted that a radar may complement cameras to help provide robust autonomous features, for example, enabling autonomous driving in true sense may require robust solutions for localization in all types of weather and environmental conditions, such that a vehicle knows its pose within few centimeters. Just like human eye, lidar and camera may not see during night times or when there is too much fog in the surroundings. Global positioning sensors like GNSS may not be available in underground, or tunnel scenarios and may be challenged in urban canyon scenarios. In some embodiments, radar sensors may utilize lower frequencies, for instance using millimeter wave (mmWave) radar (e.g., having frequencies in the range of 30 GHz-300 GHz), for enabling sub-meter-level accuracy localization in such challenging scenarios. However, as noted above, a radar may not always be available to many vehicles for reasons such as cost-saving. Accordingly, the 5G RF communication interface may be used to provide some degree of support to the automobile navigation (e.g., determine whether to increase the autonomous driving alert level) in such challenging scenarios.

The sensor positioning unit 270 may comprise a module (implemented in software and/or hardware) that is configured to fuse data from the sensors 205 to determine a position of the vehicle. As noted, the sensor positioning unit 270 may perform VIO by combining data received from the camera(s) 210 and IMU 220. The sensor positioning unit 270 may utilize data from the GNSS unit 230, radar 235, and/or wireless transceiver(s) 225 in addition or as an alternative to VIO data to determine a position of the vehicle and/or modify a determined position of the vehicle. In some embodiments, data from different sensors may be given different weights based on input type, a confidence metric (or other indication of the reliability of the input), and the like. Generally put, sensor positioning unit 270 may output an estimated position of the vehicle based on received inputs. Depending on the accuracy of the received inputs (e.g., accuracy of the data from the sensors 205, the output of the sensor positioning unit 270 may comprise highly-accurate vehicle position estimate in a global frame (or other reference frame) to the map fusion unit 280.

The map fusion unit 280 works to provide a vehicle position estimate within a map frame, based on the position estimate from the sensor positioning unit 270, as well as information from a map database 250 and a perception unit 240. The map database 250 can provide a map (e.g., a high definition (HD) map in the form of one or more electronic files, data objects, etc.) of an area in which the vehicle 110 is located. As will be disclosed in detail below, the map of the area/the trip may be obtained/downloaded to the map database 250 before the trip, in real time, or in response to certain conditions (e.g., a failure condition of the camera preventing object detection of the camera image is determined).

The perception unit 240 can make observations of lane markings, traffic signs, and/or other visual features in the vehicle's surroundings. To do so, the perception unit 240 may comprise a feature-extraction engine that performs image processing and computer vision on images received from the camera(s) 210. In some embodiments, the perception unit 240 may further operate using input from radar 235 and/or other sensors (e.g., lidar).

As previously noted, the position estimate provided by the map fusion unit 280 (i.e., the output of the positioning unit 260) may serve any of a variety of functions, depending on desired functionality. For example, it may be provided to autonomous driving, ADAS, and/or other systems of the vehicle 110 (and may be conveyed via a controller area network (CAN) bus), communicated to devices separate from the vehicle 110 (including other vehicles; servers maintained by government agencies, service providers, and the like; etc.), shown on a display of the vehicle (e.g., to a driver or other user for navigation or other purposes), and the like. The position of the vehicle may additionally be used by the vehicle to perform crowdsourced mapping according to embodiments herein.

Referring again to FIG. 1, as the vehicle 110 travels within a geographical region corresponding to an area of the map, the vehicle 110 may use different sensors (e.g., sensors 205) to gather information for different corresponding map layers of the HD map. For example, one or more cameras (e.g., camera(s) 210) can be used to gather information for a camera map layer. Optionally, radar (e.g., radar 235) can be used to gather information for a radar map layer, lidar may be used to gather information for a lidar map layer, and so forth, and RF transceivers (e.g., 5G RF communication interface) may be used to gather information for a RF map layer. Map layer information may not only be gathered regarding a road 125 on which the vehicle 110 is traveling (e.g., lane boundary information, road curvature, road hazards, etc.) but also static objects 130 in or near the road 125. (Although the static object in FIG. 1 is illustrated as a tree, other static objects may comprise traffic signs, sidewalks, traffic lights, mile markers, etc.) As described in further detail hereafter, map layer information may also filter out dynamic objects 140. Dynamic objects may generally include moving objects such as other vehicles, pedestrians, bicyclists, etc.

As previously noted, radar can be complementary to other sensors and/or map layers and useful for autonomous driving and other features in all types of weather and environmental conditions, such that a vehicle knows its pose within few centimeters. However, as noted above, a radar may not be may not always be available to many vehicles for reasons such as cost-saving. Accordingly, the 5G RF communication interface may be used to provide some degree of safety/support to the automobile navigation (e.g., determine whether to increase the autonomous driving alert level) in such challenging scenarios.

Figure 3:
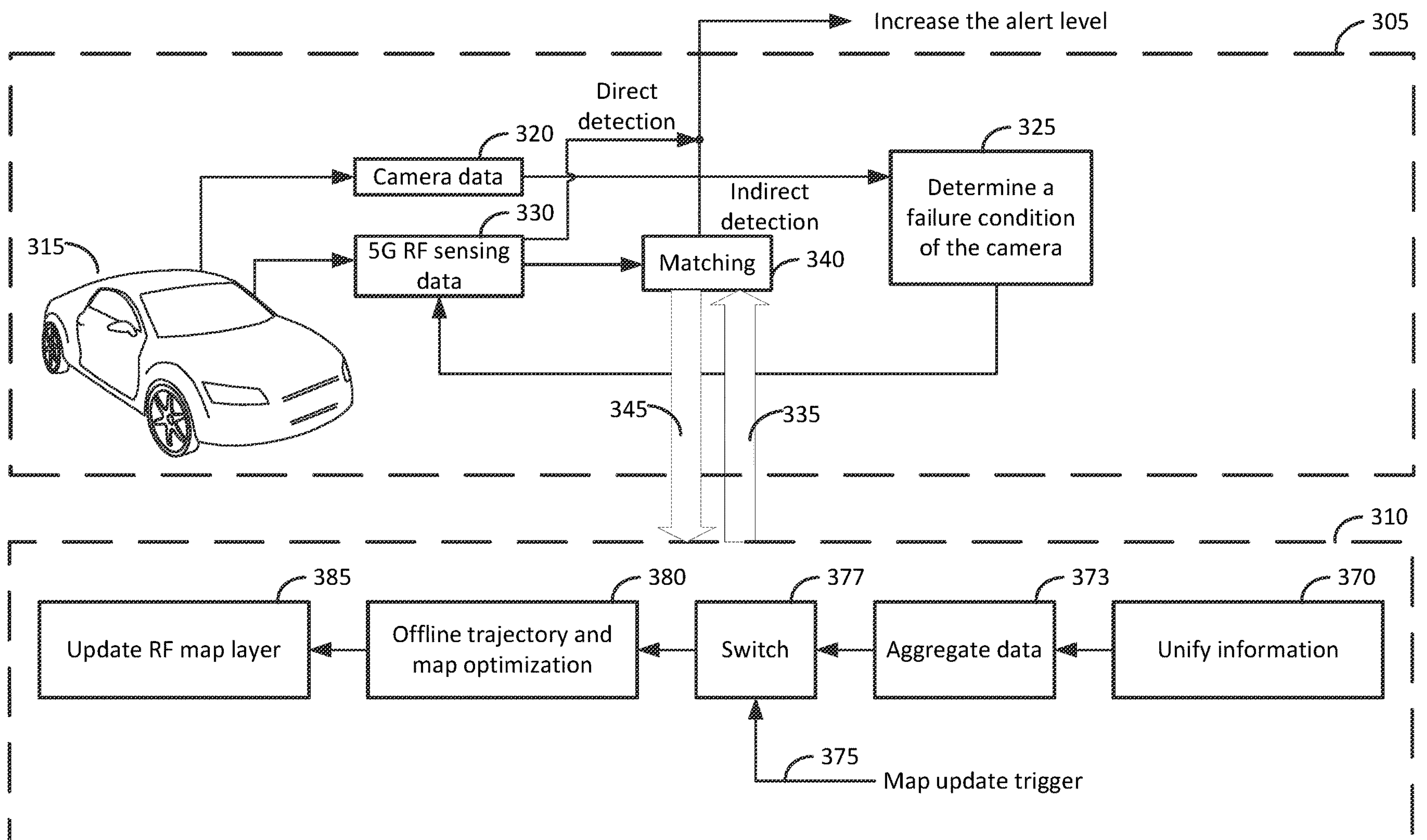
FIG. 3 is a block diagram of a method of obtaining radar and camera data for radar in camera map layers of an HD map, according to an embodiment.

FIG. 3 is a high-level concept diagram illustrating how a vehicle may perform a 5G RF sensing to support automobile navigation, according to some embodiments. The functionality illustrated in block 305 may be performed by a vehicle, and the functionality illustrated in block 310 may be performed by a server (e.g., a cloud/edge server). Alternative embodiments may distribute functionality differently between vehicle and server. Additionally, although both camera and RF sensing map layers are described, some embodiments may include one or the other (e.g., 5G RF sensing or cameras) rather than both. Further, to enable generation and maintenance of crowdsourced map of a geographical region, many vehicles may each perform the functionality at block 305 simultaneously and/or at different times while in the geographical region. The functionality illustrated in block 305 may be performed by a computing system of a vehicle, such as the mobile computing system 800 illustrated in FIG. 8 and described hereafter. Further, the automobile navigation functionality illustrated in FIG. 3 may be performed in conjunction with positioning/object detection in FIG. 2. Further, the functionality in block 310 may be performed by one or more computer systems, such as the computer system 800 illustrated in FIG. 8. Communication between the vehicle 315 and server may be facilitated via a wireless communication network (e.g., a cellular/mobile communication network and/or similar Wireless Wide Area Network (WWAN)).

Starting from block 320, the vehicle 315 may perform the automobile navigation (e.g., any level of the autonomous driving) based on the camera-based sensors collecting camera data (e.g., camera images). In some embodiments, the vehicle 315 may include camera(s) (e.g., the camera 210 shown in FIG. 2) for facilitating automobile navigation. For example, the camera may comprise stereo cameras configured to collect data regarding the depth perception of a surrounding area, and to provide information on aspects including the position, distance, speed of objects, etc. The cameras may capture the same scene from two different viewpoints simulating a pair of eyes. Using triangulation and based on the arrangement of pixels of the camera images, software (e.g., run by a processor) may compare the camera images and determines the depth information required for a 3D image.

In some embodiments, the camera may comprise time of flight (ToF) cameras, measuring the distances of objects. In some embodiments, the camera image detected may include at least two types of information on each pixel of the camera image: the intensity value—given as grey value—and the distance of the object from the camera (e.g., the depth of field). In some embodiments, the ToF cameras may be equipped with an image chip with several thousand receiving elements. This allows a scene to be captured in its entirety and with a high degree of detail in a single shot. It is understood that the types of the camera are not limited to the embodiments disclosed herein and any other suitable types of cameras (e.g., a combined camera) may be used for providing driving assistance.

At block 325, a failure condition of the camera may be determined/detected. In some embodiments, the failure condition of the camera may be determined if no object may be detected in the camera image and/or no object may be detected beyond a predetermined distance in the camera image. For example, as noted above, the perception unit 240 shown in FIG. 2 may make observations of lane markings, traffic signs, and/or other visual features in the vehicle's surroundings by performing image processing and computer vision on the camera image detected by the camera. In some situations where no object may be detected in the camera image and/or no object may be detected beyond a predetermined distance in the camera image by the perception unit 240, the camera may be determined as being in a failure condition. In some embodiments, a camera map corresponding to the determined position of the vehicle 315 (e.g., included in an HD map) may be received from the server. The failure condition of the camera may be determined if a match level between the camera images and the corresponding camera map is lower than a predetermined threshold.

In some embodiments, the failure condition of the camera may be caused by inclement weather (e.g., foggy, rainy, snowy, storms), blockage on a lens of the camera (e.g., dirt blocking a portion of or an entire aperture of the lens), lack of lights, electrical failure of the camera (e.g., malfunction), or a combination thereof. Accordingly, when a failure condition of the camera is detected, the performance of the camera-based automobile navigation may be negatively affected. Thus, it would be dangers failing to take prompt actions in response to the determination.

At block 330, in response to the determination that the failure condition of the camera happens, a 5G communication interface (e.g., the 5G RF transceivers in wireless transceiver(s) 225 shown in FIG. 2) may be activated for performing 5G RF sensing of the environment surrounding the vehicle 315 to provide extra support to the automobile navigation. For example, the 5G communication interface may be configured to transmit 5G signals to the surrounding of the vehicle 315 (e.g., scanning the surrounding of the vehicle 315). For example, the 5G communication interface may emit 5G RF sensing signals in predetermined directions (e.g., front, back, and/or different sides) and may detect the returned 5G RF sensing signals (e.g., the 5G RF sensing data), reflected by the objects/obstacles. The existence and/or the location of objects/obstacles may be determined based on a time difference between the emission of the 5G RF sensing signals and a receipt of the returned 5G RF sensing signals, reflected by the objects/obstacles, and a direction of the emission of the 5G RF sensing signal.

In some embodiments, in a direct detection, the existence and/or the location of any objects/obstacles that may interfere with/cause safety issues to the driving of the vehicle 315 (e.g., a fallen tree/branch or a rock in the middle of the road, or on the trajectory of the vehicle 315) may be determined directly based on the 5G RF sensing data. For example, upon determining the existence of the object that may interfere with the driving trajectory of the vehicle 315, the alert level of the automobile navigation may be increased (e.g., reduce the driving speed, and/or quite the automobile navigation mode and fall back to a manual mode) accordingly.

In some embodiments, in an indirect detection, as illustrated in arrow 335, a RF map corresponding to the geographical region of the vehicle 315 (e.g., determined based on the positioning of the vehicle 315 as noted above) may be received/downloaded from the server. For example, in some embodiments, before transmitting the RF map to the vehicle 315, the server may pre-process the RF map according to a specification (e.g., a model and/or an arrangement of the 5G RF antenna on the vehicle) of the requesting vehicle (e.g., the vehicle 315). For example, the server may adjust a unified RF map (e.g., a layer of an HD map) according to the specification of the requesting vehicle. In some embodiments, the server may adjust the unified RF map according to a vehicle mode, 5G RF antenna arrangement (e.g., height, allocation, emitting/detecting angle, and/or scanning pattern), etc. of the requesting vehicle so that the RF map transmitted to the requesting vehicle may be compatible with the specification of the requesting vehicle. In some embodiments, the RF map may be obtained/downloaded to a memory of the requesting vehicle (e.g., the map database 250 shown in FIG. 2) before the trip, in real time, or in response to the activation of the 5G RF sensing.

At block 340, the 5G RF sensing data may be compared with a RF map received from the server to determine if a match between the 5G RF sensing data and the RF map is below a predetermined threshold. For example, if the match level is below a predetermined threshold, a change of the environment may be determined. As a result, similar to the direct detection, at the end of block 340, if the match level is below the predetermined threshold, the alert level of the automobile navigation may be increased as a result.

Because the 5G RF signals have a better penetration of the inclement weather than visible lights, the 5G RF sensing can complement the camera-based automobile navigation (e.g., having a better detection ability) in those challenging scenarios and/or when the failure condition of the camera happens.

In some embodiments, in response to the determination at block 340 that the match level is below the predetermined threshold, as shown by arrow 345, the vehicle 315 may further upload/publish the 5G RF sensing data to the server for updating the RF map stored in the server (e.g., crowd-source mapping). In some embodiments, the 5G RF sensing data may be updated along with data indicating the match level to the server. In some embodiments, the 5G RF sensing data may be uploaded in real time (e.g., streaming), at a predetermined interval, or at the end of the trip. In some embodiments, for RF map updating purposes, before comparing the 5G RF sensing data and the RF map, the dynamic objects detected in the 5G RF sensing data, such as moving vehicles or pedestrians may be filtered out, e.g., using on a frame-by-frame basis (e.g., similar to methods in filtering out unwanted targets in radar data). This may reduce the volume of the data to be published by removing unwanted information from the raw data (e.g., the 5G RF sensing data).

For example, the frame-by-frame filtering may comprise a Doppler check, an ego speed check, and a metadata check which is optional. It can be noted that some embodiments may not perform the functionality of all of the functions disclosed herein and/or may not necessarily perform the operations in the order described. To identify and remove moving targets, the Doppler check and the ego speed check may be performed on a per-frame basis, which can filter out unwanted or noisy points. As a person of ordinary skill in the art may appreciate, the Doppler check may perform better filtering of moving objects at higher speeds, whereas the ego speed check may perform better filtering of moving objects at lower speeds. The optional metadata check may comprise a check of certain metrics (e.g., signal to noise ratio (SNR), specific indicators on multipath targets, and the like) to determine a reliability of the 5G RF sensing data and filter out data failing to meet a minimum threshold.

The Doppler check may be performed, for example, by estimating radial velocity of detected targets in the environment and comparing the detected velocity of point targets with the theoretical velocity of stationary targets, given the speed of the vehicle. For example, if the ego speed of the 5G RF interface mounted on the vehicle is v, and the 5G RF interface is mounted on the vehicle with yaw angle (with respect to heading direction) equal to $\phi$ then the expected Doppler velocity of targets at azimuth angle $\theta$ is $v\cos(\theta+\phi)$. Since usually the vehicle velocity will not be measured at the 5G RF interface itself, but at some other fixed frame on the vehicle, the measured velocity of the vehicle may need to be transformed to the 5G RF sensing frame using linear and angular velocity of the vehicle measured at the fixed frame. The Doppler check may be implemented by filtering out all the targets with reported Doppler velocity which is outside $v\cos(\theta+\phi)\pm\varepsilon$ m/s interval. A typical value of $\varepsilon$ could be less than 1 m/s.

In some embodiments, after the frame-by-frame filtering, a Batch filtering may comprise batch filtering based on a clustering algorithm may be performed to the 5G RF sensing data to further reduce the volume of the raw data. It can be noted that some embodiments may not necessarily perform the filtering operations in the order describe herein. That said, embodiments the batch filtering may not necessarily be performed after frame-by-frame filtering operations are completed.

Once the server receives the published data, the server may then perform the operations illustrated in block 310. These operations may include performing the functionality illustrated at block 370, where the server unifies information received from multiple vehicles. As noted, the server may be communicatively coupled with many vehicles in a particular geographical region. Using the functionality illustrated in block 305, each of these vehicles may publish information including the specification of the vehicles to the server. However, the sensor types (e.g., arrangements, layout, parameters) and other specifications of the publishing vehicle may differ between the publishing vehicles, resulting in sensor data having different coordinate information, scale, format, etc. Thus, the unification performed at block 370 may comprise unifying this data to a common coordinates system, scale, format, etc. according to the specification of the vehicle (e.g., including the specification of the 5G RF interface) published along with the 5G RF sensing data.

At block 373, the server may then aggregate the data (e.g., 5G RF sensing data), storing data published by multiple vehicles over window of time. The server may continue to aggregate this data until receiving an update trigger, as shown by arrow 375. Depending on desired functionality, the trigger may cause the server to aggregate data across a periodic window of time and/or until a certain event occurs. The map update trigger may therefore comprise a periodic trigger (e.g., once every six hours, once every 12 hours, once every day, etc.) and/or an event-based trigger (e.g., based on a determination that the quality of an HD map layer is below a threshold and needs to be updated, based on input received from one or more vehicles, etc.).

In response to the map update trigger activating a switch 377 (e.g., a logical switch), the server can then process the aggregated data to determine off-line trajectory and optionally, map optimization, as indicated at block 380. This may result in newly-optimized RF sensing layer information, which can be used to update the RF map layer as shown at block 385. More specifically, because the newly-optimized RF map layer information generated at block 380 may be for a portion (e.g., a neighborhood of a city) of a larger/global HD map (e.g., of a city, state, country, etc.), the updating performed at block 385 may comprise updates to the larger/global HD map layers with the newly optimized RF map layers.

Figure 4:
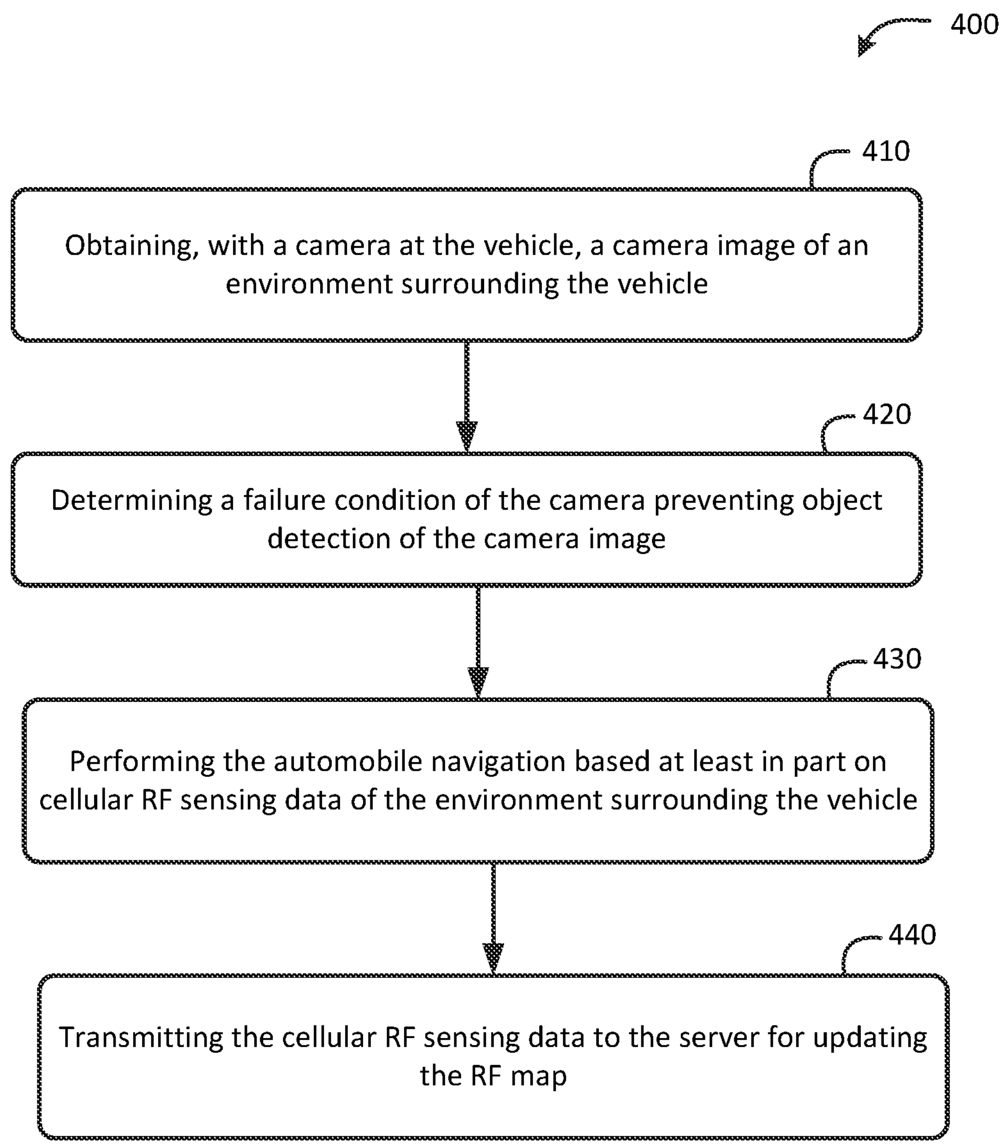
FIG. 4 is a flow diagram of a method of a vehicle performing a cellular RF sensing to support automobile navigation, according to an embodiment.
Figure 8:
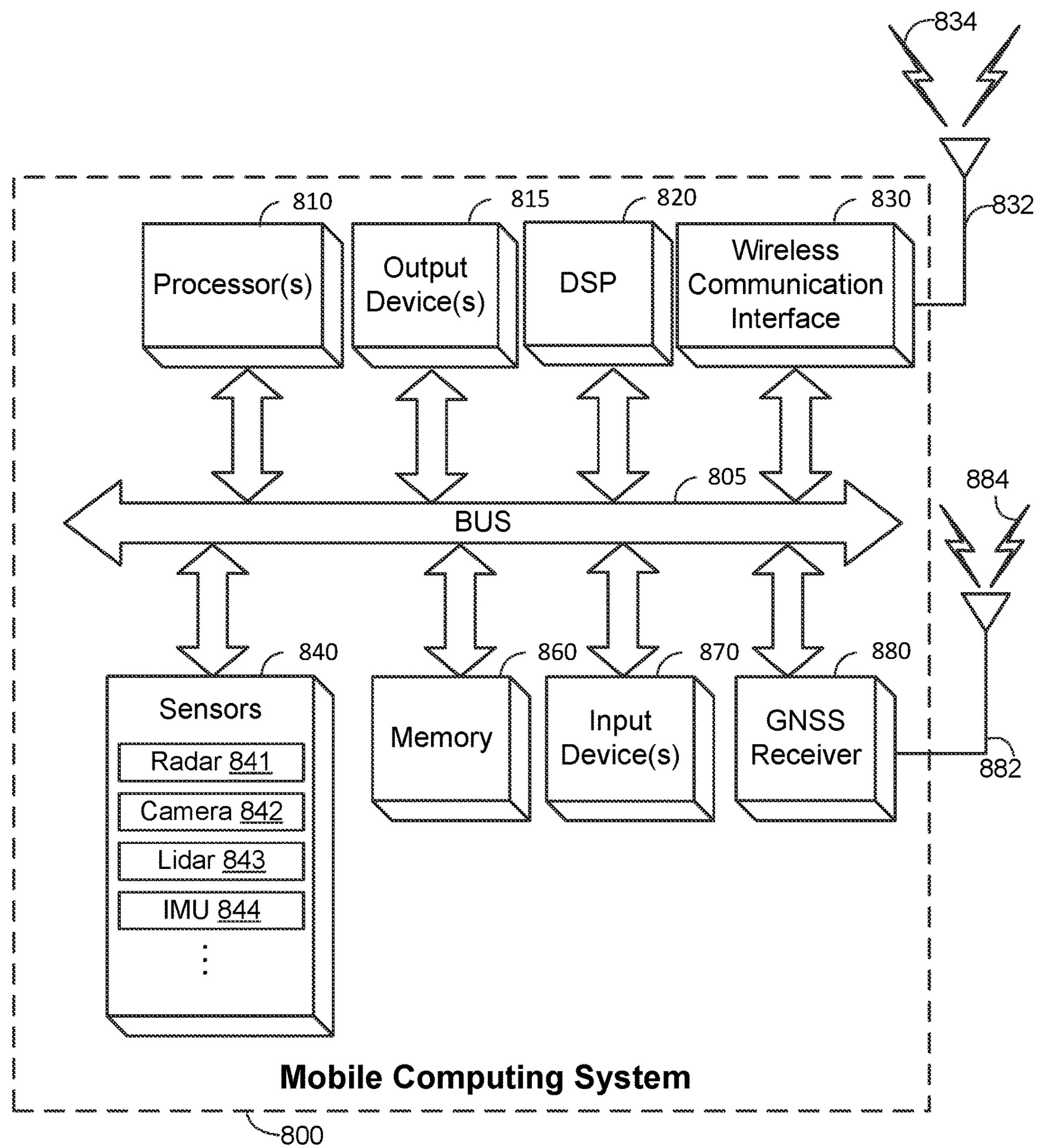
FIG. 8 is a block diagram of an embodiment of a mobile computing system.

FIG. 4 is a flow diagram of a method 400 of a vehicle performing a cellular RF sensing to support automobile navigation, according to an embodiment. Means for performing the functionality illustrated in one or more of the blocks shown in FIG. 4 may be performed by hardware and/or software components of a vehicle or, more generally, a mobile computing system (which may be incorporated into a vehicle). Example components of a mobile computing system are illustrated in FIG. 8, which is described in more detail below.

At block 410, the functionality comprises obtaining, with a camera at the vehicle, a camera image of an environment surrounding the vehicle. As indicated in the previously-described embodiments, the vehicle (e.g., the vehicle 315 shown in FIG. 3) may include stereo cameras, ToF cameras, combined cameras, or any other cameras suitable for obtaining camera images of an environment surrounding the vehicle for the autonomous driving. Means for performing functionality at block 410 may comprise a bus 805, processor(s) 810, digital signal processor (DSP) 820, wireless communication interface, sensors 840 (including radar 841), memory 860, and/or other components of a mobile computing system 800, as illustrated in FIG. 8.

At block 420, the functionality comprises determining a failure condition of the camera preventing object detection of the camera image. As indicated in the previously-described embodiments, the camera may be determination as being in the failure condition if 1. no object (e.g., lane markings, traffic signs, and/or other visual features in the vehicle's surroundings) may detected (e.g., by the perception unit 240 shown in FIG. 2) in the camera image, 2. no object may be detected beyond a predetermined distance in the camera image, or a combination thereof. In some embodiments, a camera map corresponding to the determined position of the vehicle (e.g., included in an HD map) may be received from the server. The failure condition of the camera may be determined if a match level between the camera images and the corresponding camera map is lower than a predetermined threshold. In some embodiments, the failure condition of the camera may be caused by inclement weather (e.g., fogy, rainy, snowy, storms), blockage on a lens of the camera (e.g., a dirt blocking a portion of or an entire aperture of the lens), lack of lights, electrical failure of the camera (e.g., malfunction), or a combination thereof. Means for performing functionality at block 410 may comprise a bus 805, processor(s) 810, digital signal processor (DSP) 820, wireless communication interface, sensors 840 (including radar 841), memory 860, and/or other components of a mobile computing system 800, as illustrated in FIG. 8.

At block 430, the functionality comprises performing the automobile navigation based at least in part on cellular RF sensing data of the environment surrounding the vehicle. As indicated in the previously-described embodiments, in response to the determination that the failure condition of the camera happens, a cellular communication interface (e.g., the cellular RF transceivers in wireless transceiver(s) 225 shown in FIG. 2) may be activated for performing cellular RF sensing of the environment surrounding the vehicle to provide extra support to the automobile navigation.

Figure 5:
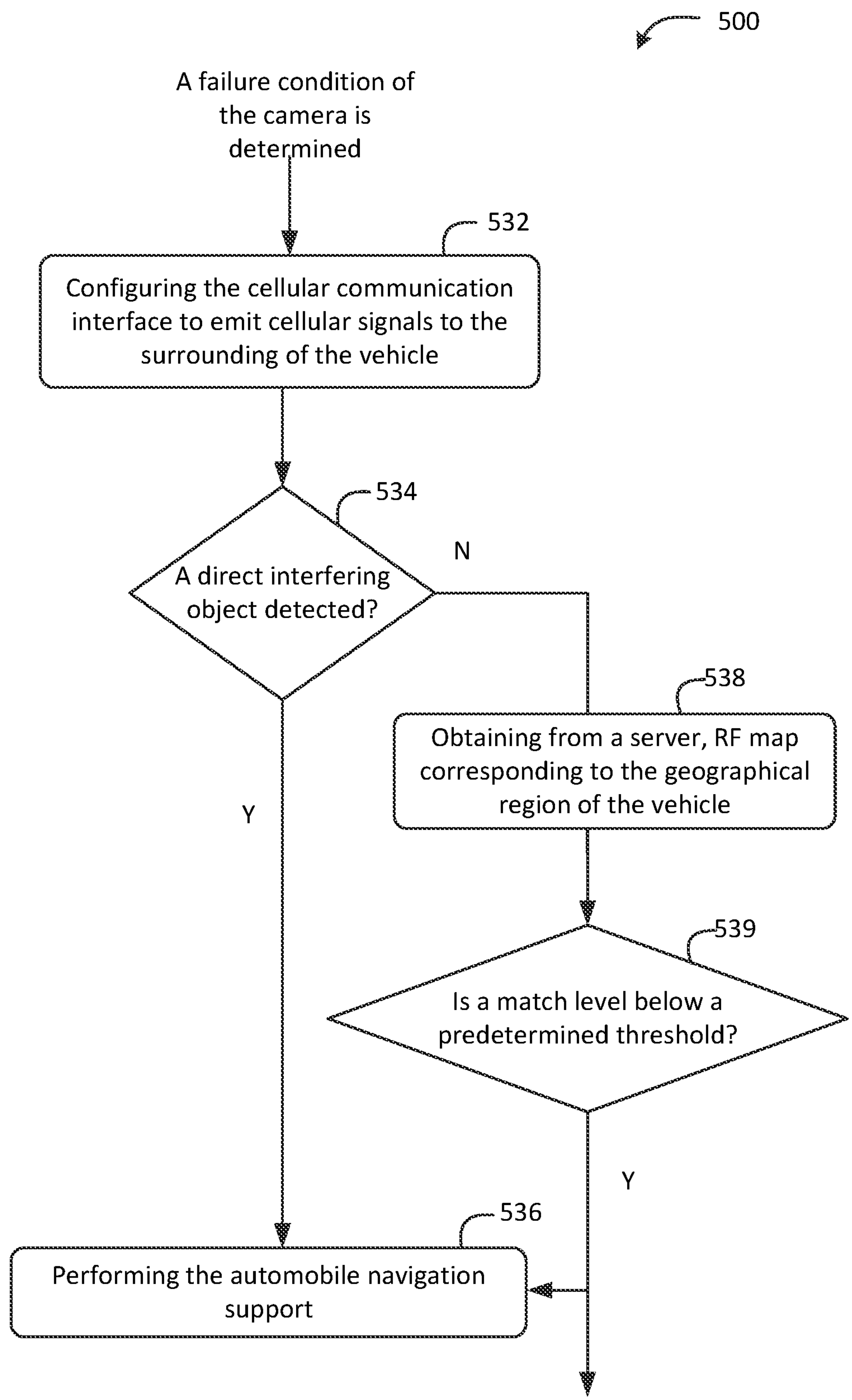
FIG. 5 is a flow diagram of a method for performing the automobile navigation based on cellular RF sensing, according to an embodiment.

For example, FIG. 5 is a flow diagram of a method 500 for performing the functionality of block 430 shown in FIG. 4, according to an embodiment. Means for performing the functionality illustrated in one or more of the blocks shown in FIG. 5 may be performed by hardware and/or software components of a vehicle or, more generally, a mobile computing system (which may be incorporated into a vehicle). Example components of a mobile computing system are illustrated in FIG. 8, which is described in more detail below.

At block 532, the functionality comprises configuring the cellular communication interface to emit cellular signals to the surrounding of the vehicle (e.g., scanning the surrounding of the vehicle). For example, the cellular communication interface may emit cellular RF sensing signals in predetermined directions (e.g., front, back, and/or different sides) and may detect the returned cellular RF sensing signals (e.g., the cellular RF sensing data), reflected by the objects/obstacles. The existence and/or the location of objects/obstacles may be determined based on a time difference between the emission of the cellular RF sensing signals and a receipt of the returned cellular RF sensing signals, reflected by the objects/obstacles, and a direction of the emission of the cellular RF sensing signal.

At block 534, the functionality comprises determining if a direct interfering object is detected (e.g., a fallen tree/branch or a rock in the middle of the road, or on the trajectory of the vehicle 315). In some embodiments, if the direct interfering object is detected (the output at block 534 is "Y"), at block 536, the functionality comprises performing the automobile navigation support based at least in part on cellular RF sensing data of the environment surrounding the vehicle. For example, in a direct detection, the existence and/or the location of any objects/obstacles that may interfere with/cause safety issues to the driving of the vehicle may be determined directly based on the cellular RF sensing data. As indicated in the previously-described embodiments, performing the automobile navigation support may include increasing the alert level of the automobile navigation (e.g., reduce the driving speed, and/or quite the automobile navigation mode and fall back to a manual mode) accordingly.

In some embodiments, if no direct interfering object is detected (the output at block 534 is "N"), in an indirect detection, at block 538, the functionality comprises obtaining, from a server, RF map corresponding to the geographical region of the vehicle (e.g., determined based on the positioning of the vehicle as noted above). For example, in some embodiments, before transmitting the RF map to the vehicle, the server may pre-process the RF map according to a specification (e.g., a model and/or an arrangement of the cellular RF antenna on the vehicle) of the requesting vehicle (e.g., the vehicle). For example, the server may adjust a unified RF map (e.g., a layer of an HD map) according to the specification of the requesting vehicle. In some embodiments, the server may adjust the unified RF map according to a vehicle mode, cellular RF antenna arrangement (e.g., height, allocation, emitting/detecting angle, and/or scanning pattern), etc. of the requesting vehicle so that the RF map transmitted to the requesting vehicle may be compatible with the specification of the requesting vehicle. In some embodiments, the RF map may be obtained/downloaded to a memory of the requesting vehicle (e.g., the map database 250 shown in FIG. 2) before the trip, in real time, or in response to the activation of the cellular RF sensing.

In some embodiments, at block 539, the functionality comprises determining if a match level between the cellular RF sensing data and the RF map received from the server is below a predetermined threshold. For example, if the match level is below a predetermined threshold, a change of the environment may be determined. As a result, the method 500 proceed to block 536, where the functionality comprises performing the automobile navigation support based at least in part on cellular RF sensing data of the environment surrounding the vehicle. As indicated in the previously-described embodiments, performing the automobile navigation support may include increasing the alert level of the automobile navigation (e.g., reduce the driving speed, and/or quite the automobile navigation mode and fall back to a manual mode) accordingly.

Means for performing functionality at blocks 532, 534, 536, 538 and 539 may comprise a bus 805, processor(s) 810, digital signal processor (DSP) 820, wireless communication interface, sensors 840 (including radar 841), memory 860, and/or other components of a mobile computing system 800, as illustrated in FIG. 8.

Referring back to FIG. 4, in response to the determination that a match level is below the predetermined threshold (the output at block 539 shown in FIG. 5 being "Y"), method 400 proceeds to block 440 where the functionality comprises transmitting the cellular RF sensing data to the server for updating the RF map. As indicated in the previously-described embodiments, the vehicle 315 may further upload/publish the cellular RF sensing data to the server for updating the RF map stored in the server (e.g., crowdsource mapping). In some embodiments, the cellular RF sensing data may be updated along with data indicating the match level to the server. In some embodiments, the cellular RF sensing data may be uploaded in real time (e.g., streaming), at a predetermined interval, or at the end of the trip. In some embodiments, for RF map updating purposes, before comparing the cellular RF sensing data with the RF map, the dynamic objects detected in the cellular RF sensing data, such as moving vehicles or pedestrians may be filtered out, e.g., using on a frame-by-frame basis (e.g., similar to methods in filtering out unwanted targets in radar data). This may reduce the volume of the data to be published by removing unwanted information from the raw data (e.g., the cellular RF sensing data).

For example, the frame-by-frame filtering may comprise a Doppler check, an ego speed check, and a metadata check which is optional. It can be noted that some embodiments may not perform the functionality of all of the functions disclosed herein and/or may not necessarily perform the operations in the order described. To identify and remove moving targets, the Doppler check and the ego speed check may be performed on a per-frame basis, which can filter out unwanted or noisy points. As a person of ordinary skill in the art may appreciate, the Doppler check may perform better filtering of moving objects at higher speeds, whereas the ego speed check may perform better filtering of moving objects at lower speeds. The optional metadata check may comprise a check of certain metrics (e.g., signal to noise ratio (SNR), specific indicators on multipath targets, and the like) to determine a reliability of the cellular RF sensing data and filter out data failing to meet a minimum threshold.

The Doppler check may be performed, for example, by estimating radial velocity of detected targets in the environment and comparing the detected velocity of point targets with the theoretical velocity of stationary targets, given the speed of the vehicle. For example, if the ego speed of the cellular RF interface mounted on the vehicle is v, and the cellular RF interface is mounted on the vehicle with yaw angle (with respect to heading direction) equal to $\phi$ then the expected Doppler velocity of targets at azimuth angle $\theta$ is $v \cos(\theta+\phi)$. Since usually the vehicle velocity will not be measured at the cellular RF interface itself, but at some other fixed frame on the vehicle, the measured velocity of the vehicle may need to be transformed to the cellular RF sensing frame using linear and angular velocity of the vehicle measured at the fixed frame. The Doppler check may be implemented by filtering out all the targets with reported Doppler velocity which is outside $v \cos(\theta+\phi)\pm\varepsilon$ m/s interval. A typical value of $\varepsilon$ could be less than 1 m/s.

In some embodiments, after the frame-by-frame filtering, a Batch filtering may comprise batch filtering based on a clustering algorithm may be performed to the cellular RF sensing data to further reduce the volume of the raw data. It can be noted that some embodiments may not necessarily perform the filtering operations in the order describe herein. That said, embodiments the batch filtering may not necessarily be performed after frame-by-frame filtering operations are completed. Means for performing functionality at block 440 may comprise a bus 805, processor(s) 810, digital signal processor (DSP) 820, wireless communication interface, sensors 840 (including radar 841), memory 860, and/or other components of a mobile computing system 800, as illustrated in FIG. 8.

Figure 6:
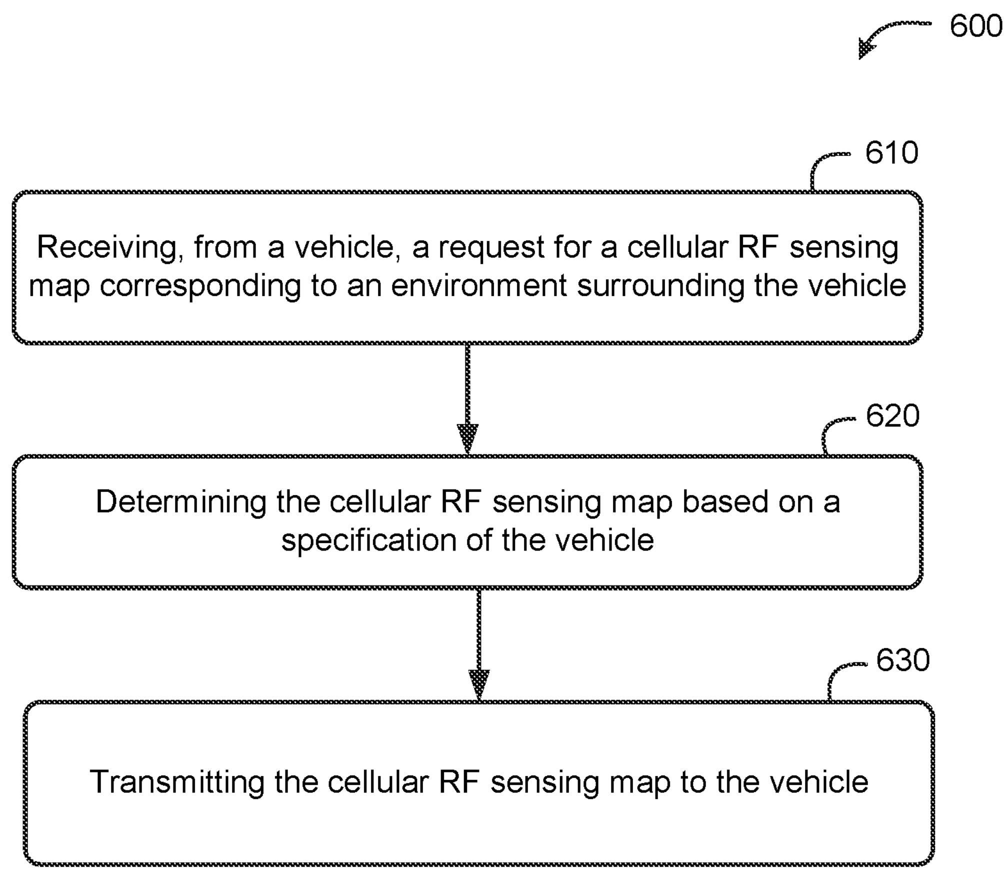
FIG. 6 is a flow diagram of a method for a server transmitting a RF map to a requesting vehicle for performing a cellular RF sensing, according to an embodiment.
Figure 9:
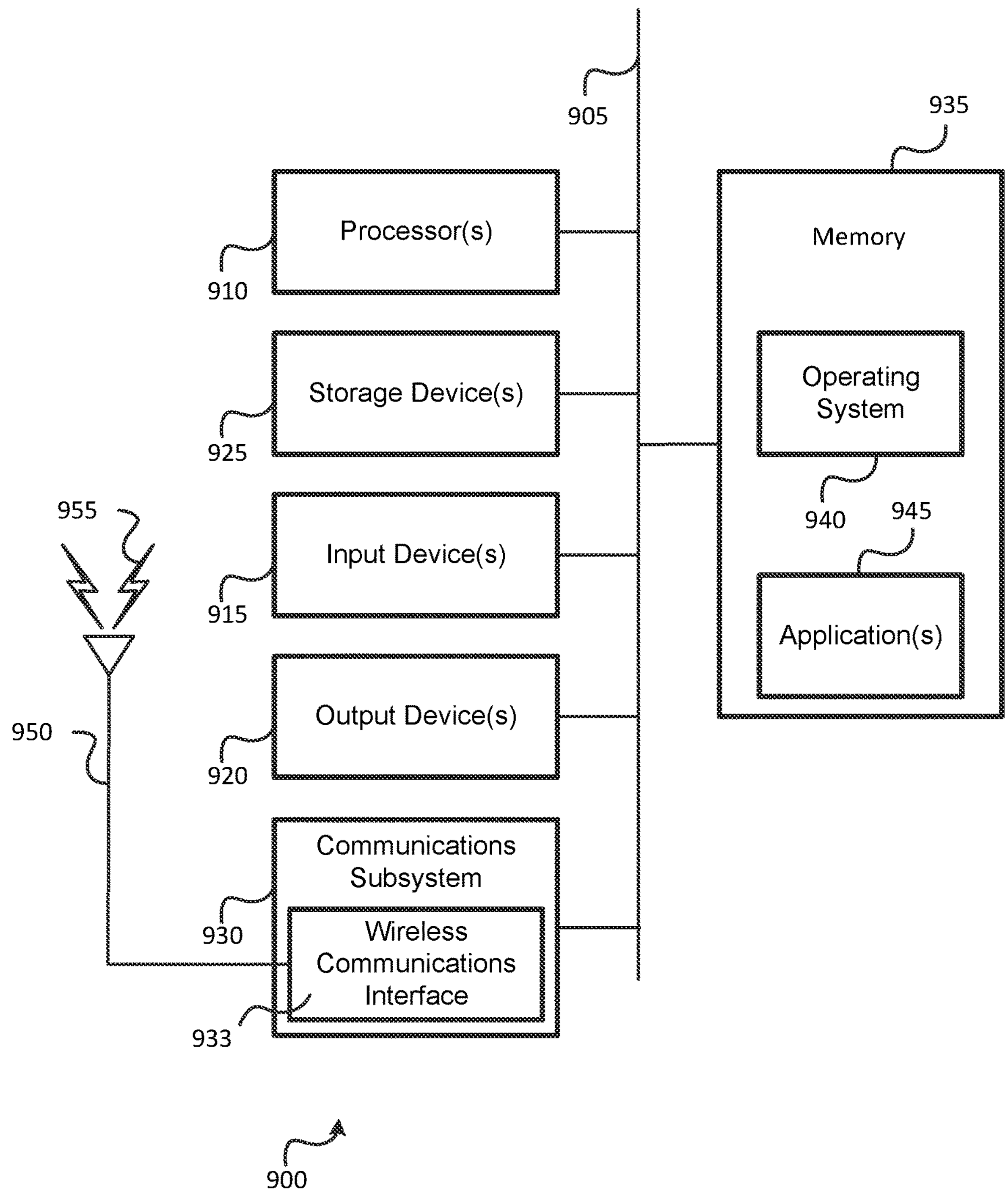
FIG. 9 is a block diagram of an embodiment of a computer system.

FIG. 6 is a flow diagram of a method 600 for a server transmitting a RF map to a requesting vehicle for performing a cellular RF sensing, according to an embodiment. Means for performing the functionality illustrated in one or more of the blocks shown in FIG. 6 may be performed by hardware and/or software components of a vehicle or, more generally, a mobile computing system (which may be incorporated into a vehicle). Example components of a computing system are illustrated in FIG. 9, which is described in more detail below.

At block 610, the functionality comprises receiving, from a vehicle, a request for a cellular RF sensing map corresponding to an environment surrounding the vehicle. As indicated in the previously-described embodiments, the cellular RF sensing map may be a layer of a HD map or a map generated based on data obtained from cellular RF communication interfaces of different serve vehicles (e.g., crowed sourced cellular RF sensing map). In some embodiments, the corresponding environment surrounding the requesting vehicle may be determined based on positioning of the requesting vehicle. Means for performing functionality at block 610 may comprise a bus 905, processor(s) 910, input devices 915, communications subsystem 930 (wireless communications interface 933), memory 935, and/or other components of a computer system 900, as illustrated in FIG. 9.

At block 620, the functionality comprises determining the cellular RF sensing map based on a specification of the vehicle. As indicated in the previously-described embodiments, the cellular RF sensing map stored at the server may be unified (e.g., classified cellular RF sensing data according to the specification of the publishing vehicle and/or adjusted cellular RF sensing data according to a unified format based on the specification of the publishing vehicle). For example, the server may pre-process the cellular RF sensing map according to a specification (e.g., a model and/or an arrangement of the cellular RF antenna on the vehicle) of the requesting vehicle (e.g., the vehicle 315). For example, the server may adjust a unified cellular RF sensing map (e.g., a layer of an HD map) according to the specification of the requesting vehicle. In some embodiments, the server may adjust the unified cellular RF sensing map according to a vehicle mode, cellular RF antenna arrangement (e.g., height, allocation, emitting/detecting angle, and/or scanning pattern), etc. of the requesting vehicle so that the cellular RF sensing map transmitted to the requesting vehicle may be compatible with the specification of the requesting vehicle. Means for performing functionality at block 620 may comprise a bus 905, processor(s) 910, input devices 915, communications subsystem 930 (wireless communications interface 933), memory 935, and/or other components of a computer system 900, as illustrated in FIG. 9.

At block 630, the functionality comprises transmitting the cellular RF sensing map to the vehicle. As indicated in the previously-described embodiments, the cellular RF sensing map be transmitted in response to receiving the request, or the cellular RF sensing map be obtained ahead of time (e.g., before the trip and/or at a region where the network for data transmission is good). Means for performing functionality at block 630 may comprise a bus 905, processor(s) 910, input devices 915, communications subsystem 930 (wireless communications interface 933), memory 935, and/or other components of a computer system 900, as illustrated in FIG. 9.

Figure 7:
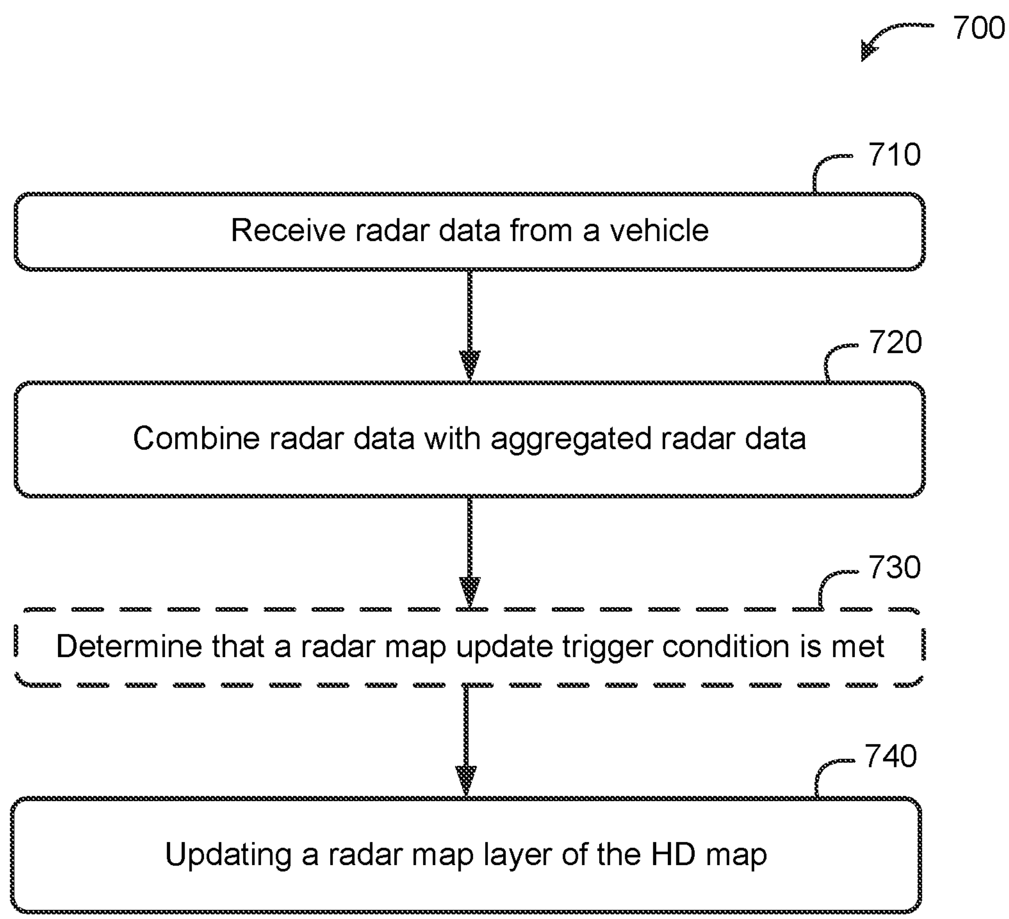
FIG. 7 is a flow diagram of a method for obtaining data at a vehicle for updating a RF layer (e.g., the RF map) of an HD map, according to an embodiment FIG, according to some embodiments.

FIG. 7 is a flow diagram of a method 700 for obtaining data at a vehicle for a RF layer (e.g., the RF map) of an HD map, according to an embodiment. Means for performing the functionality illustrated in one or more of the blocks shown in FIG. 7 may be performed by hardware and/or software components of a server or, more generally, a computer system. Example components of a computer system 900 are illustrated in FIG. 9, which is described in more detail below.

At block 710, the functionality comprises receiving cellular RF sensing data from a vehicle. As indicated in the previously-described embodiments, receiving the cellular RF sensing data from the vehicle may occur after the computer server initially provides the vehicle with RF map within a geographical region corresponding to at least a portion of the HD map. Providing the RF map may be responsive to a request by the vehicle. Further, the request may indicate that the vehicle can ingest a RF map layer of the HD map. As noted, the vehicle may transmit the cellular RF sensing data responsive to a determination that a match level between the cellular RF sensing data and the RF map is below a threshold. Moreover, the cellular RF sensing data may comprise cellular RF sensing data obtained by the cellular RF communication interface of the vehicle that is on a frame-by-frame basis based at least in part on a Doppler velocity measured by the cellular RF communication interface, and linear and angular velocities of the vehicle when the cellular RF sensing data was obtained. The cellular RF sensing data may be obtained within the geographical region corresponding to a subregion/tile of the HD map. cellular RF sensing data may be used, among other things, for position determination of the vehicle and/or localization of the vehicle within the HD map.

The contents of the received cellular RF sensing data (and/or aggregated cellular RF sensing data described hereafter with respect to block 720) and/or the way in which the cellular RF sensing data is received, may vary, depending on desired functionality. The cellular RF sensing data may be filtered, as previously described, and/or may include other types of cellular RF sensing data. In certain implementations or road scenarios, for example, the cellular RF sensing data may include dynamic and/or static obstacle data (in addition or as an alternative to filtered cellular RF sensing data) detected by radar. In some implementations, the cellular RF sensing data received at the server that generates the HD map layer may not directly come from the vehicle that collects the cellular RF sensing data but may come via a backhaul network. This may occur, for example, when the vehicle uploads the data to nearest infrastructure radio head which then transmits the data via wireless and/or wired network means to the server maintaining the HD map. Such data over backhaul network may not be in same format, for example, as cellular RF sensing data received directly from a vehicle (e.g., as previously described with respect to FIG. 4).

Means for performing functionality at block 710 may comprise a bus 905, processor(s) 910, input devices 915, communications subsystem 930 (wireless communications interface 933), memory 935, and/or other components of a computer system 900, as illustrated in FIG. 9.

At block 720, the functionality comprises combining the cellular RF sensing data with aggregated cellular RF sensing data. As previously indicated, combining cellular RF sensing data from a vehicle with aggregated cellular RF sensing data (e.g., from one or more additional vehicles and/or previously provided by the vehicle) may comprise unifying the cellular RF sensing data. This may comprise, for instance, conforming the received cellular RF sensing data to a particular coordinate system, scale, format, etc., or combination thereof. The cellular RF sensing data may be stored with respect to rear axle frame of ego vehicle along with associated ego pose or it may be stored directly in a fixed reference frame like ECEF, in which case the points are mapped from rear axle frame to ECEF using the ego pose.

Means for performing functionality at block 720 may comprise a bus 905, processor(s) 910, input devices 915, communications subsystem 930 (wireless communications interface 933), memory 935, and/or other components of a computer system 900, as illustrated in FIG. 9.

The functionality at block 730 comprises determining that a RF map update trigger condition is met, which may be optional (as indicated by the dashed lines in FIG. 7). As previously indicated, the aggregated data may then be used for optimizing the different map layers, including the RF map layer, and the trajectory of the vehicles that reported the data. As such, according to some embodiments, if the RF map update trigger condition is met, the computer system may optimize the RF map and pose trajectory and update the RF map layer of the HD map. As noted previously, the RF map update trigger condition may be periodic, or event based. Determining an event-based trigger may include, for example, determining a certain number of reports from vehicles have arrived in a particular region, or multiple vehicles (e.g., a threshold number of vehicles) have indicated a change in the environment (e.g., lane closure, construction sign boards added or removed, significant change in parked cars in surroundings, etc.) as perceived by uploaded cellular RF sensing data and/or camera map layer data.

Means for performing functionality at block 730 may comprise a bus 905, processor(s) 910, input devices 915, communications subsystem 930 (wireless communications interface 933), memory 935, and/or other components of a computer system 900, as illustrated in FIG. 9.

The functionality at block 740 comprises updating the RF map layer of the HD map. According to some embodiments, this may comprise replacing an existing corresponding tile in the HD map with the newly-built radar map tile. According to some embodiments, if a list of candidate tiles has been made (and, optionally, if the list contains at least a threshold number of candidate tiles), then the server can select a replacement tile from the list and replace the existing corresponding tile in the HD map with the replacement tile. The selection of the replacement tile may involve a selection process as previously described with regard to block 880 of FIG. 8.

Means for performing functionality at block 740 may comprise a bus 905, processor(s) 910, input devices 915, communications subsystem 930 (wireless communications interface 933), memory 935, and/or other components of a computer system 900, as illustrated in FIG. 9.

FIG. 8 is a block diagram of an embodiment of a mobile computing system 800, which can be incorporated into a vehicle and utilized as described herein above (e.g., in association with FIGS. 1-7) to enable the vehicle to perform the functions of the embodiments described herein. For example, the mobile computing system 800 can perform one or more of the functions of the method shown in FIGS. 4 and 5. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 8.

The mobile computing system 800 is shown comprising hardware elements that can be electrically coupled via a bus 805 (or may otherwise be in communication, as appropriate), which may include a vehicle-specific bus such as a Controller Area Network (CAN) bus. The hardware elements may include a processor(s) 810 which can include without limitation one or more general-purpose processors (e.g., an application processor), one or more special-purpose processors (such as DSP chips, graphics acceleration processors, application specific integrated circuits (ASICs), and/or the like), and/or other processing structures or means. Processor(s) 810 may comprise one or more processing units, which may be housed in a single integrated circuit (IC) or multiple ICs. As shown in FIG. 8, some embodiments may have a separate DSP 820, depending on desired functionality. Location determination and/or other determinations based on wireless communication may be provided in the processor(s) 810 and/or wireless communication interface 830 (discussed below). The mobile computing system 800 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The mobile computing system 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile computing system 800 to communicate with other devices as described in the embodiments above. The wireless communication interface 830 may permit data and signaling to be communicated (e.g., transmitted and received) with transmission/reception points (TRPs) of a network, for example, via cellular base stations (e.g., eNBs, gNBs, ng-eNBs, etc.), access points, and/or other access node types, and/or other network components, computer systems, and/or any other electronic devices communicatively coupled with TRPs, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile computing system 800 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement Global System for Mobile communications (GSM), Digital Advanced Mobile Phone System (D-AMPS), or some other radio access technology (RAT). An OFDMA network may employ long-term evolution (LTE), LTE Advanced, fifth generation (5G) new radio (NR), and so on. 5G NR, LTE, LTE Advanced, GSM, and WCDMA are described in documents from 3GPP. CDMA2000® is described in documents from a consortium named “3rd Generation Partnership Project 2” (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile computing system 800 can further include sensors 840. Sensor(s) 840 may correspond to sensors 205 of FIG. 2, and may therefore include a radar 841, camera 842, and other sensors. As illustrated, sensors 840 may further comprise lidar 843, IMU 844, and more. Sensors 840 may further comprise accelerometer(s), gyroscope(s), magnetometer(s), altimeter(s), microphone(s), proximity sensor(s), light sensor(s), barometer(s), sonar, and/or sensors from vehicle systems (e.g., wheel sensors, speedometer, etc.). As described herein, sensors may be used to obtain information regarding position and/or movement.

Embodiments of the mobile computing system 800 may also include a GNSS receiver 880 (e.g., corresponding to GNSS unit 230 of FIG. 2) capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the mobile computing system 800, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term “GNSS receiver” may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 810 or DSP 820.

The mobile computing system 800 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile computing system 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile computing system 800 (and/or processor(s) 810 or DSP 820 within mobile computing system 800). In some embodiments, then, such code and/or instructions can be used to configure and/or adapt a general-purpose computer (or other device) to perform one or more operations in accordance with the described methods.

FIG. 9 is a block diagram of an embodiment of a computer system 900, which may be used, in whole or in part, to provide the functions of a server or other computing device as described in the embodiments herein (e.g., the cloud/edge server described with respect to FIGS. 3-7). For example, the computing system 900 can perform one or more of the functions of the method shown in FIGS. 6 and 7. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different geographical locations.

The computer system 900 is shown comprising hardware elements that can be electrically coupled via a 905 (or may otherwise be in communication, as appropriate). The hardware elements may include processor(s) 910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 900 also may comprise one or more input devices 915, which may comprise without limitation a mouse, a keyboard, a camera, a microphone, and/or the like; and one or more output devices 920, which may comprise without limitation a display device, a printer, and/or the like.

The computer system 900 may further include (and/or be in communication with) one or more non-transitory storage devices 925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 900 may also include a communications subsystem 930, which may comprise wireless communication technologies managed and controlled by a wireless communication interface 933, as well as wired technologies (such as Ethernet, coaxial communications, universal serial bus (USB), and the like). The wireless communication interface 933 may comprise one or more wireless transceivers that may send and receive wireless signals 955 (e.g., signals according to 5G NR or LTE) via wireless antenna(s) 950. Thus the communications subsystem 930 may comprise a modem, a network card (wireless or wired), an infrared communication device, a wireless communication device, and/or a chipset, and/or the like, which may enable the computer 900 to communicate on any or all of the communication networks described herein to any device on the respective network, including a User Equipment (UE), base stations and/or other TRPs, and/or any other electronic devices described herein. Hence, the communications subsystem 930 may be used to receive and send data as described in the embodiments herein.

In many embodiments, the computer system 900 will further comprise a working memory 935, which may comprise a RAM or ROM device, as described above. Software elements, shown as being located within the working memory 935, may comprise an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general-purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method for obtaining data at a vehicle for automobile navigation based on cellular radio frequency (RF) sensing comprising obtaining, with a camera at the vehicle, a camera image of an environment surrounding the vehicle. The method further comprises determining a failure condition of the camera preventing object detection of the camera image, wherein the failure condition is caused by inclement weather, blockage on a lens of the camera, electrical failure of the camera, or a combination thereof. The method further comprises responsive to determining the failure condition of the camera, configuring a cellular communication interface of the vehicle to obtain cellular RF sensing data of the environment surrounding the vehicle. The method further comprises performing the automobile navigation support based at least in part on cellular RF sensing data of the environment surrounding the vehicle.

Clause 2. The method of clause 1 further comprising: obtaining, from a server, a RF sensing map corresponding to the environment surrounding the vehicle; and increasing an alert level responsive to a determination that a match between the cellular RF sensing data and the RF sensing map is below a predetermined threshold, wherein increasing the alert level comprises at least one of reducing a driving speed of the vehicle or falling back to a manual driving mode.

Clause 3. The method of clauses 1 an 2, wherein the RF sensing map comprises a crowdsourced RF sensing map that is modified based on a specification of the vehicle.

Clause 4. The method of clauses 1-3 further comprising: filtering the cellular RF sensing data on a frame-by-frame basis to remove cellular RF sensing data generated by moving objects.

Clause 5. The method of clauses 1-4, further comprising: determining a match level between the cellular RF sensing data and the RF sensing map; and transmitting data indicating the match to the server for updating the RF sensing map.

Clause 6. The method of clauses 1-5 wherein the RF sensing map is obtained in response to the determination of the failure condition of the camera.

Clause 7. The method of clauses 1-6, wherein the RF sensing map corresponding to the environment surrounding the vehicle is obtained at a predetermined time point.

Clause 8. The method of clauses 1-7, wherein the failure condition of the camera is determined based on: a determination that no object is detected in the camera image; a determination that no object is detected beyond a predetermined distance in the camera image; or a combination thereof.

Clause 9. The method of clauses 1-8, wherein determining the failure condition of the camera further comprises: obtaining, from a server, a camera map corresponding to the environment surrounding the vehicle, and wherein the failure condition of the camera is determined based on: a determination that a match level between the camera image and the camera map is below a predetermined threshold.

Clause 10. A device comprising a transceiver; a memory; and one or more processing units communicatively coupled with the transceiver and the memory, the one or more processing units configured to perform the method of any of clauses 1-10.

Clause 11. An example method for updating a RF sensing map based on cellular radio frequency (RF) sensing comprising obtaining, from a first vehicle, a first set of cellular RF sensing data of an environment surrounding the first vehicle. The method further comprises determining a unified cellular RF sensing map based on unifying the first set of cellular RF sensing data with a second set of cellular RF sensing data, wherein the second set of cellular RF sensing data is obtained from a second vehicle. The method further comprises updating a RF sensing map, corresponding to the environment surrounding the first vehicle based on the unified cellular RF sensing map, responsive to a determination that a match between the unified cellular RF sensing map and the RF sensing map is below a predetermined threshold.

Clause 12. The method of clause 11, wherein the first set of cellular RF sensing data is determined responsive to determining a failure condition of a camera of the first vehicle.

Clause 13. The method of any of clauses 11 and 12, wherein the failure condition of the camera is determined based on: a determination that no object is detected in a camera image obtained by the camera; a determination that no object is detected beyond a predetermined distance in the camera image; or a combination thereof.

Clause 14. The method of any of clauses 11-13, wherein the first set of cellular RF sensing data is filtered on a frame-by-frame basis to remove cellular RF sensing data generated by moving objects.

Clause 15. The method of any of clauses 11-14 further comprising: receiving, from a third vehicle, a request for the updated RF sensing map corresponding to an environment surrounding the third vehicle; adjusting the updated RF sensing map based on a specification of the third vehicle; and transmitting the adjusted RF sensing map to the third vehicle.

Clause 16. The method of any of clauses 11-15, wherein the request is transmitted in response to a determination of a failure condition of a camera of the third vehicle.

Clause 17. The method of any of clauses 11-16, wherein the failure condition of the camera is determined based on: a determination that no object is detected in a camera image obtained by the camera; a determination that no object is detected beyond a predetermined distance in the camera image; or a combination thereof.

Clause 18. A device comprising a transceiver; a memory; and one or more processing units communicatively coupled with the transceiver and the memory, the one or more processing units configured to perform the method of any of clauses 11-17.

Clause 19. An example method for using a RF sensing map for assisting cellular RF sensing for automobile navigation comprising obtaining, from a server, the RF sensing map corresponding to a trip before the trip. The method further comprises obtaining, by a cellular communication interface of a vehicle, cellular RF sensing data of an environment surrounding the vehicle, wherein obtaining the cellular RF sensing data is responsive to a determination of a failure condition of a camera of the vehicle, preventing object detection of a camera image obtained by the camera, wherein the condition is caused by inclement weather, blockage on a lens of the camera, electrical failure of the camera, or a combination thereof. The method further comprises increasing an alert level responsive to a determination that a match between the cellular RF sensing data and the RF sensing map is below a predetermined threshold, wherein increasing the alert level comprises at least one of reducing a driving speed of the vehicle or falling back to a manual driving mode.

Clause 20. The method of clause 19, wherein the RF sensing map comprises a crowdsourced RF sensing map that is modified based on a specification of the vehicle.

Clause 21. The method of any of clauses 19 and 20 further comprising: filtering the cellular RF sensing data on a frame-by-frame basis to remove cellular RF sensing data generated by moving objects.

Clause 22. The method of any of clauses 19-21, further comprising: determining a match level between the cellular RF sensing data and the RF sensing map; and transmitting data indicating the match to the server for updating the RF sensing map.

Clause 23. The method of any of clauses 19-22, wherein the failure condition of the camera is determined based on: a determination that no object is detected in the camera image; a determination that no object is detected beyond a predetermined distance in the camera image; or a combination thereof.

Clause 24. The method of any of clauses 19-23, wherein determining the failure condition of the camera comprises: obtaining, from a server, a camera map corresponding to the environment surrounding the vehicle, and wherein the failure condition of the camera is determined based on: a determination that a match level between the camera image and the camera map is below a predetermined threshold.

Clause 25. A device comprising a transceiver; a memory; and one or more processing units communicatively coupled with the transceiver and the memory, the one or more processing units configured to perform the method of any of clauses 19-24.

Clause 26. An example method for automobile navigation using cellular RF sensing map comprising receiving, from a vehicle, a request for a cellular RF sensing map corresponding to an environment surrounding the vehicle, wherein the cellular RF sensing map is generated based on data obtained from cellular RF communication interfaces. The method further comprises determining the cellular RF sensing map based on a specification of the vehicle. The method further comprises transmitting the cellular RF sensing map to the vehicle.

Clause 27. The method of clause 26, wherein the request is transmitted in response to a determination of a failure condition of a camera of the vehicle.

Clause 28. The method of any of clauses 26 and 27, wherein the failure condition of the camera is determined based on: a determination that no object is detected in a camera image obtained by the camera; a determination that no object is detected beyond a predetermined distance in the camera image; or a combination thereof.

Clause 29. The method of any of clauses 26-28, wherein the cellular RF sensing map is determined based on unifying a first set of cellular RF sensing data received from a first vehicle with a second set of cellular RF sensing data from a second vehicle.

Clause 30. The method of any of clauses 26-29, wherein the first set of cellular RF sensing data is determined responsive to determining a failure condition of a camera of the first vehicle.

Clause 31. The method of clauses 26-30, wherein the first set of cellular RF sensing data is filtered on a frame-by-frame basis to remove cellular RF sensing data generated by moving objects.

Clause 32. A device comprising a transceiver; a memory; and one or more processing units communicatively coupled with the transceiver and the memory, the one or more processing units configured to perform the method of any of clauses 26-31.

What is claimed is:

1. A method for updating a RF sensing map based on cellular radio frequency (RF) sensing comprising:

obtaining, from a first vehicle, a first set of cellular RF sensing data of an environment surrounding the first vehicle;

determining a unified cellular RF sensing map based on unifying the first set of cellular RF sensing data with a second set of cellular RF sensing data, wherein the second set of cellular RF sensing data is obtained from a second vehicle; and updating a RF sensing map, corresponding to the environment surrounding the first vehicle based on the unified cellular RF sensing map, responsive to a determination that a match between the unified cellular RF sensing map and the RF sensing map is below a predetermined threshold.

2. The method of claim 1, wherein the first set of cellular RF sensing data is determined responsive to determining a failure condition of a camera of the first vehicle.

3. The method of claim 2, wherein the failure condition of the camera is determined based on:

a determination that no object is detected in a camera image obtained by the camera;

a determination that no object is detected beyond a predetermined distance in the camera image; or a combination thereof.

4. The method of claim 1, wherein the first set of cellular RF sensing data is filtered on a frame-by-frame basis to remove cellular RF sensing data generated by moving objects.

5. The method of claim 1 further comprising:

receiving, from a third vehicle, a request for the updated RF sensing map corresponding to an environment surrounding the third vehicle;

adjusting the updated RF sensing map based on a specification of the third vehicle; and transmitting the adjusted RF sensing map to the third vehicle.

6. The method of claim 5, wherein the request is transmitted in response to a determination of a failure condition of a camera of the third vehicle.

7. The method of claim 6, wherein the failure condition of the camera is determined based on:

a determination that no object is detected in a camera image obtained by the camera;

a determination that no object is detected beyond a predetermined distance in the camera image; or a combination thereof.

* * * * *